US008712094B2

United States Patent
Anan et al.

(10) Patent No.: US 8,712,094 B2
(45) Date of Patent: Apr. 29, 2014

(54) DIGITAL WATERMARK EMBEDDING APPARATUS, DIGITAL WATERMARK EMBEDDING METHOD, AND DIGITAL WATERMARK DETECTION APPARATUS

(71) Applicant: Fujitsu Limited, Kawasaki (JP)

(72) Inventors: Taizo Anan, Kawasaki (JP); Kensuke Kuraki, Ichikawa (JP); Shohei Nakagata, Kawasaki (JP); Jun Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/775,850

(22) Filed: Feb. 25, 2013

(65) Prior Publication Data

US 2013/0170695 A1    Jul. 4, 2013

Related U.S. Application Data

(63) Continuation of application No. PCT/JP2010/064635, filed on Aug. 27, 2010.

(51) Int. Cl.
*G06K 9/00* (2006.01)

(52) U.S. Cl.
USPC .......................... 382/100; 386/260

(58) Field of Classification Search
CPC .... G06T 1/0021; G06T 1/0028; G06T 1/0085
USPC .......................... 382/100; 386/260
See application file for complete search history.

(56) References Cited

U.S. PATENT DOCUMENTS

| 5,061,998 | A | 10/1991 | Yasuki et al. | |
|---|---|---|---|---|
| 7,436,977 | B2 * | 10/2008 | Wang et al. | 382/100 |
| 7,672,474 | B2 * | 3/2010 | Nakamura et al. | 382/100 |
| 7,697,716 | B2 * | 4/2010 | Miller et al. | 382/100 |

(Continued)

FOREIGN PATENT DOCUMENTS

| JP | 3-10483 | 1/1991 |
|---|---|---|
| JP | 2003-169273 | 6/2003 |

(Continued)

OTHER PUBLICATIONS

International Search Report of PCT/JP2010/064635 mailed Nov. 22, 2010.

(Continued)

*Primary Examiner* — Stephen R Koziol
*Assistant Examiner* — Shaghayegh Azima
(74) *Attorney, Agent, or Firm* — Staas & Halsey LLP

(57) ABSTRACT

A digital watermark embedding apparatus includes an interface unit which acquires video data and digital watermark information, and a processing unit which embeds the digital watermark information into the video data. The processing unit is adapted to: determine the position of a watermark pattern so that the watermark pattern moves with time according to the value of a symbol contained in the digital watermark information within a first moving range that contains at least a portion of a reference region on each image, and so that the average pixel value of the reference region overlapped with the watermark pattern varies in a periodic fashion as the watermark pattern moves; and correct the value of each pixel contained in a region where the reference region and the watermark pattern overlap each other by using the value of a corresponding one of the pixels contained in the watermark pattern.

15 Claims, 16 Drawing Sheets

(56) References Cited

U.S. PATENT DOCUMENTS

| | | |
|---|---|---|
| 8,208,683 B2 | 6/2012 | Yamamoto et al. |
| 8,605,939 B2 * | 12/2013 | Yamamoto et al. ........... 382/100 |
| 2001/0030759 A1 * | 10/2001 | Hayashi et al. ................ 358/1.9 |
| 2003/0012404 A1 * | 1/2003 | Matsumura et al. .......... 382/100 |
| 2003/0053003 A1 | 3/2003 | Nishi et al. |
| 2004/0024588 A1 * | 2/2004 | Watson et al. ............. 704/200.1 |
| 2006/0126889 A1 * | 6/2006 | Nakamura et al. ........... 382/100 |
| 2006/0133647 A1 * | 6/2006 | Werner et al. ................ 382/100 |
| 2006/0256965 A1 * | 11/2006 | Rowe ............................ 380/251 |
| 2006/0291653 A1 * | 12/2006 | Kawada et al. ............... 380/201 |
| 2008/0089552 A1 * | 4/2008 | Nakamura et al. ........... 382/100 |
| 2008/0273741 A1 | 11/2008 | Fujii et al. |
| 2009/0021793 A1 * | 1/2009 | Lu et al. ....................... 358/3.28 |
| 2009/0074242 A1 * | 3/2009 | Yamamoto et al. ........... 382/100 |
| 2009/0285442 A1 * | 11/2009 | Magai et al. ................. 382/100 |
| 2011/0228972 A1 * | 9/2011 | Nakamura et al. ............ 382/100 |
| 2012/0163653 A1 * | 6/2012 | Anan et al. .................... 382/100 |
| 2013/0028465 A1 * | 1/2013 | Kuraki et al. ................. 382/100 |
| 2014/0016817 A1 * | 1/2014 | Nakagata et al. ............. 382/100 |

FOREIGN PATENT DOCUMENTS

| | | |
|---|---|---|
| JP | 2004-179744 | 6/2004 |
| JP | 2006-270215 | 10/2006 |
| WO | 2005/079072 A1 | 8/2005 |
| WO | 2007/102403 A1 | 9/2007 |

OTHER PUBLICATIONS

J. Haitsma et al., "A Watermaking Scheme for Digital Cinema", International Conference on Image Processing (ICIP), vol. 2, Oct. 2001, pp. 487-489.

* cited by examiner 501
502
502a 501
502

501
502

501
502
502a 501
502

501
502

| 1 | 2 | 3 | 4 |
|---|---|---|---|
| 5 | 6 | 7 | 8 |
| 9 | 10 | 11 | 12 |

901

| 7 | 1 | 8 | 2 |
|---|---|---|---|
| 9 | 3 | 10 | 4 |
| 11 | 5 | 12 | 6 |

902

DIGITAL WATERMARK EMBEDDING APPARATUS, DIGITAL WATERMARK EMBEDDING METHOD, AND DIGITAL WATERMARK DETECTION APPARATUS

CROSS-REFERENCE TO RELATED APPLICATION

This application is a continuation application and is based upon PCT/JP2010/064635, filed on Aug. 27, 2010, the entire contents of which are incorporated herein by reference.

FIELD

The embodiments discussed herein are related to a digital watermark embedding apparatus and a digital watermark embedding method which embed digital watermark information into video data, and a digital watermark detection apparatus for detecting digital watermark information embedded in video data.

BACKGROUND

Services for delivering video content such as movies over the Internet or the like have in use in recent years. Such video content is encrypted by Digital Rights Management (DRM) technology before delivery. DRM technology protects the video content against illegal copying and distribution. Notwithstanding such copy protection, there are many instances in which content viewers illegally copy video content by capturing the video content displayed on a computer display or a television monitor by using an image capturing apparatus such as a camcorder, and illegally distribute the thus copied video content. Since the video content displayed on the display is not encrypted, it is difficult to prevent the distribution of the video content copied by capturing the displayed video.

In view of the above, a technology has been developed that embeds information such as a viewer identification number into video data in the form of a digital watermark before delivering the video data. If the video data in which the digital watermark is embedded is illegally copied by capturing the displayed image using a camcorder, the digital watermark remains intact in the copied video data. Therefore, if the video data illegally copied by means of such analog capture is distributed, the identification number of the viewer that has made illegal use of the video content can be identified by detecting the digital watermark from the illegally copied video data. Accordingly, even when the video content illegally copied by means of analog capture is uploaded to a video uploading website, for example, the administrator of the video content can identify the illegal copy source from the information embedded in the uploaded video content.

Generally, it is preferable to embed a digital watermark in video data in such a manner that the digital watermark embedded in the video data is imperceptible to the viewer. To embed the digital watermark in the video data so as to be imperceptible to the viewer, it is preferable to reduce the variation in luminance that occurs due to the presence of the digital watermark, i.e., the difference in pixel value between the digital watermark embedded region and its peripheral region. However, if the difference in pixel value between the digital watermark embedded region and its peripheral region is small, the digital watermark may be lost when the video data in which the digital watermark is embedded is compressed using a video compression standard such as Moving Picture Experts Group (MPEG). The digital watermark may also be lost due to image distortions, etc., that occur when the video data in which the digital watermark is embedded is captured using a camcorder or the like. On the other hand, if the difference in pixel value between the digital watermark embedded region and its surrounding region is large, the above problem may not occur, but in this case, the digital watermark may become perceptible to the viewer. In other words, there is a tradeoff between the degree to which the pixel value can be made to spatially change due to the presence of the digital watermark and the degree to which the digital watermark can be made robust. To solve this tradeoff problem, various digital watermarking techniques have been invented (for example, refer to Japanese Laid-open Patent Publication No. H03-10483, Published Japanese Translation of PCT International Publication for Patent Application (Kohyo) No. 2007/102403, Japanese Laid-open Patent Publication No. 2004-179744, and Japanese Laid-open Patent Publication No. 2006-270215).

For example, Japanese Laid-open Patent Publication No. H03-10483 discloses an appended signal multiplexing apparatus in which a main signal is output in a field repetitive manner, an appended signal is also output in a field repetitive manner but by inverting its phase for each field, and the main signal and the appended signal are multiplexed together.

Published Japanese Translation of PCT International Publication for Patent Application (Kohyo) No. 2007/102403 discloses a digital watermark embedding apparatus which embeds embedding information in the form of a digital watermark into an input signal having dimensions equal to or greater than N. This digital watermark embedding apparatus generates an (N−1)-dimensional pattern based on the embedding information, generates an N-dimensional embedding pattern by modulating a periodic signal in accordance with values on the (N−1)-dimensional pattern, and superimposes the embedding pattern on the input signal. Alternatively, the digital watermark embedding apparatus superimposes the (N−1)-dimensional pattern on an (N−1)-dimensional plane in a portion of the signal obtained by orthogonal transformation of the input signal, and applies an inverse orthogonal transformation to the signal on which the (N−1)-dimensional pattern has been superimposed.

Japanese Laid-open Patent Publication No. 2004-179744 discloses a digital watermark embedding apparatus in which the position of a geometric pattern embedded in a moving image is caused to vary along a time axis on a frame-by-frame basis in accordance with encoded watermark information. The digital watermark embedding apparatus causes the position of the geometric pattern to vary with time in such a manner as to be convex upward or downward depending on the value of the watermark information.

Japanese Laid-open Patent Publication No. 2006-270215 discloses a digital watermark embedding method in which a symbol component contained in a digital watermark pattern to be embedded in each frame is caused to vary from frame to frame, for example, using a spread pattern generated by spread spectrum.

According to the technique disclosed in Japanese Laid-open Patent Publication No. H03-10483, a digital watermark detection apparatus for detecting the embedded information enhances the embedded information by obtaining inter-frame differences and detects the thus enhanced information. This requires that the moving image frame displayed on the display be precisely synchronized with the frame of the video camera used to capture the video data presented on the display. However, it is quite rare that the frame display rate of the display precisely coincides with the frame capture rate of the video camera. As a result, it is highly likely that the digital watermark detection apparatus fails to detect the digital watermark information from the video data copied by means of analog capture.

The technique disclosed in Published Japanese Translation of PCT International Publication for Patent Application (Kohyo) No. 2007/102403 differs from the technique disclosed in Japanese Laid-open Patent Publication No. H03-10483 in that the precise frame synchronization is not needed. Therefore, according to the technique disclosed in Published Japanese Translation of PCT International Publication for Patent Application (Kohyo) No. 2007/102403, the robustness of the watermark information against analog capture is improved. However, the technique disclosed in Published Japanese Translation of PCT International Publication for Patent Application (Kohyo) No. 2007/102403 has the problem that a phenomenon called "defocusing" that causes noise to appear stuck to an image occurs because the position of the embedded watermark is fixed.

On the other hand, according to the technique disclosed in Japanese Laid-open Patent Publication No. 2004-179744, if some of the frames are decimated from the video data created by analog-capturing the video data in which the digital watermark information is embedded, it becomes difficult to locate the reference position that is set midway between the upper and lower edges of the geometric pattern. This makes it difficult to detect the digital watermark. Further, in order to locate the position of the geometric pattern in the image, the difference in pixel value between the region where the geometric pattern is embedded and its peripheral region has to be made large enough, which results in image quality degradation. Furthermore, since the image generally contains many images of objects moving in translational fashion, it is difficult to distinguish the movements of such objects from the movement of the geometric pattern, thus making it difficult to detect the geometric pattern. Then, if the digital watermark detection apparatus fails to detect the geometric pattern in some of the frames, it becomes difficult to detect the digital watermark, just like when the frames are decimated.

Further, according to the technique disclosed in Japanese Laid-open Patent Publication No. 2006-270215, since the spread pattern is different for each frame, the digital watermark detection apparatus has to estimate the spread pattern for each frame, thus making the watermark detection all the more difficult.

SUMMARY

According to one embodiment, digital watermark embedding apparatus is provided. The digital watermark embedding apparatus includes: an interface unit which acquires video data and digital watermark information; and a processing unit which embeds the digital watermark information into the video data. The processing unit implements: a watermark pattern position determining function which determines the position of a watermark pattern including a plurality of pixels and to be superimposed on each image contained in the video data so that the watermark pattern moves with time according to the value of a symbol contained in the digital watermark information within a first moving range that contains at least a portion of a reference region defined in a designated position on each image contained in the video data, and so that an average pixel value of the reference region overlapped with the watermark pattern varies in a periodic fashion as the watermark pattern moves; and a watermark pattern superimposing function which corrects the value of each pixel contained in a region where the reference region and the watermark pattern overlap each other by using the value of a corresponding one of the pixels contained in the watermark pattern.

According to another embodiment, digital watermark embedding method is provided. The digital watermark embedding method includes: acquiring video data and digital watermark information; determining the position of a watermark pattern including a plurality of pixels and to be superimposed on each image contained in the video data so that the watermark pattern moves with time according to the value of a symbol contained in the digital watermark information within a first moving range that contains at least a portion of a reference region defined in a designated position on each image contained in the video data, and so that an average pixel value of the reference region overlapped with the watermark pattern varies in a periodic fashion as the watermark pattern moves; and correcting the value of each pixel contained in a region where the reference region and the watermark pattern overlap each other by using the value of a corresponding one of the pixels contained in the watermark pattern.

According to still another embodiment, computer program for causing a computer to execute the process of embedding digital watermark information into video data is provided. The computer program includes instruction codes for causing the computer to carry out: determining the position of a watermark pattern including a plurality of pixels and to be superimposed on each image contained in the video data so that the watermark pattern moves with time according to the value of a symbol contained in the digital watermark information within a first moving range that contains at least a portion of a reference region defined in a designated position on each image contained in the video data, and so that an average pixel value of the reference region overlapped with the watermark pattern varies in a periodic fashion as the watermark pattern moves; and correcting the value of each pixel contained in a region where the reference region and the watermark pattern overlap each other by using the value of a corresponding one of the pixels contained in the watermark pattern.

According to yet another embodiment, digital watermark detection apparatus is provided. The digital watermark detection apparatus includes: an interface unit which acquires video data in which digital watermark information is embedded; and a processing unit which detects the digital watermark information embedded in the video data. The processing unit implements: a pixel value averaging function which calculates, for each image contained in the video data, an average pixel value of a reference region defined in a designated position on the image; a watermark pattern detection function which, when the average pixel value of the reference region varies with time, determines that a watermark pattern corresponding to a symbol contained in the digital watermark information and included in a symbol pattern encoded using an error-correcting code or an error-detecting code is embedded in the image; a watermark phase detection function which detects a phase with which the average pixel value of the reference region varies; and a digital watermark information extraction function which computes all possible symbol patterns from differences in the phase, and determine that the value of a symbol included in a symbol pattern detected as being error free from among the symbol patterns when decoded by the error-correcting code or error-detecting code is the value of the symbol contained in the digital watermark information.

Alternatively, the processing unit implements, instead of the watermark pattern detection function, phase detection function, digital watermark information extraction function described above, a watermark pattern detection function which, when the average pixel value of the reference region varies with time, determines that a watermark pattern corresponding to a symbol contained in the digital watermark information is embedded in the image, a watermark pattern moving direction detection function which identifies the moving direction of the watermark pattern based on a temporal variation of the value of each pixel contained in the reference region, and a digital watermark information extraction function which refers to a mapping table that provides a mapping between the moving direction of the watermark pattern and values that the symbol contained in the digital watermark information can take, and determines that the value corresponding to the moving direction of the watermark pattern is the value of the symbol contained in the digital watermark information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Digital watermark embedding apparatus according to various embodiments will be described below with reference to the drawings. According to the digital watermark embedding apparatus described herein, the area of a region where a watermark pattern indicating the presence of embedded watermark information overlaps a reference region defined on each image contained in video data is caused to vary along a time axis, thereby causing the average pixel value of the reference region to vary with time.

Each image contained in the video data may be either a frame or a field. A frame refers to one complete still image in the video data, while a field refers to a still image obtained by extracting data only in the odd-numbered lines or even-numbered lines from one frame.

Figure 1:
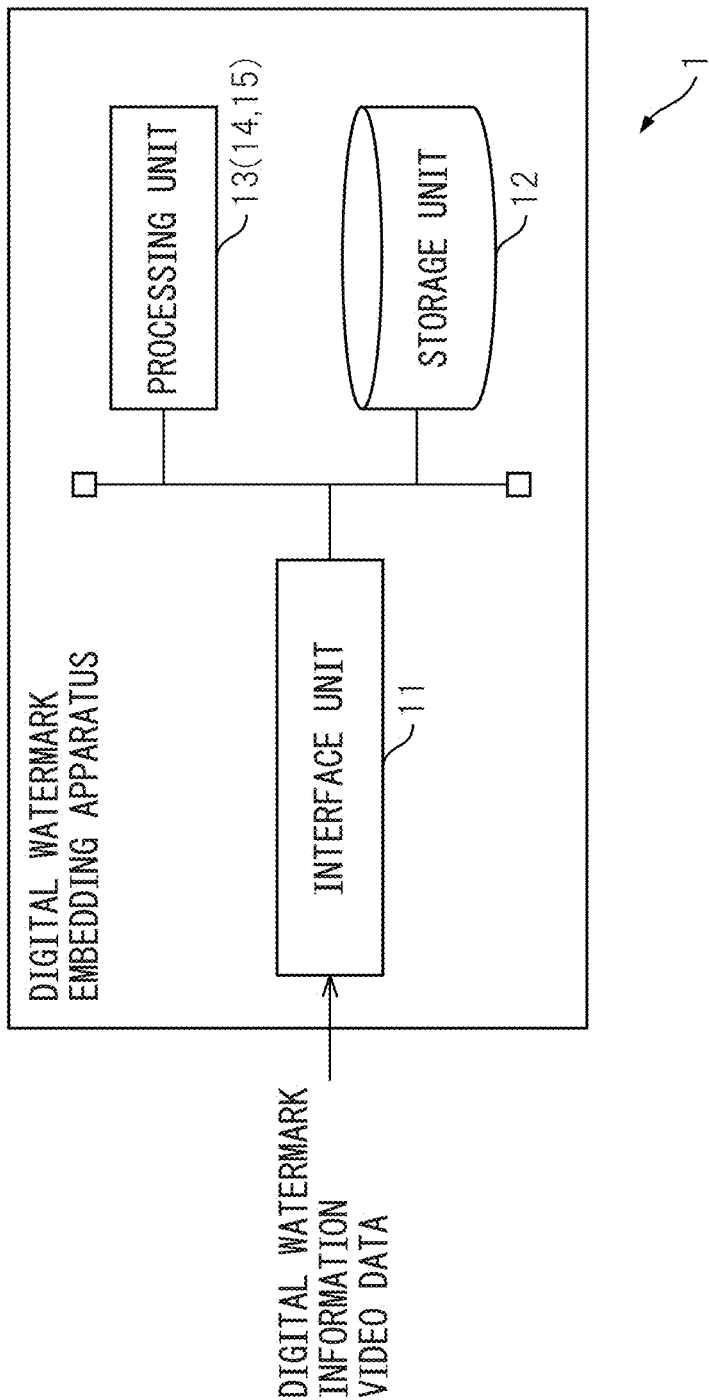
FIG. 1 is a diagram illustrating in simplified form the configuration of a digital watermark embedding apparatus according to a first embodiment.

FIG. 1 is a diagram illustrating in simplified form the configuration of a digital watermark embedding apparatus according to one embodiment. The digital watermark embedding apparatus 1 includes an interface unit 11, a storage unit 12, and a processing unit 13. The digital watermark embedding apparatus 1 embeds digital watermark information into the video data acquired via the interface unit 11.

The interface unit 11 includes, for example, a video signal interface for connecting the digital watermark embedding apparatus 1 to a moving image input device such as a camcorder (not depicted) or an image display device such as a liquid crystal display (not depicted), and a control circuit for the video signal interface. Alternatively, the interface unit 11 may include a communication interface for connecting the digital watermark embedding apparatus 1 to a communication network conforming to a communication standard such as the Ethernet (registered trademark), and a control circuit for the communication interface. Further alternatively, the interface unit 11 connects the digital watermark embedding apparatus 1 to an antenna for receiving video data delivered via a wireless link, and includes a circuit for decoding the video data received via the antenna.

The interface unit 11 acquires video data from the moving image input device or via the communication network or the antenna, and passes the video data to the processing unit 13.

The interface unit 11 may further include an interface circuit conforming to a bus standard such as Universal Serial Bus, in order to connect a user interface device, such as a keyboard or a mouse, to the digital watermark embedding apparatus 1. Then, the interface unit 11 acquires, from the user interface device or the communication network, data to be embedded as digital watermark information into the video data, and passes the acquired data to the processing unit 13.

The digital watermark information contains at least one identification number selected, for example, from among the identification number of the viewer, the identification number of the video data provider, and the identification number of the video reproducing apparatus in which the digital watermark embedding apparatus 1 is incorporated. In the present application, one of the plurality of digits or signs constituting the viewer's identification number, etc. contained in the digital watermark information, for example, one bit, is taken as a symbol. Accordingly, the symbol contained in the digital watermark information takes one of a plurality of predetermined different values. For example, if the symbol contained in the digital watermark information is a bit, the symbol takes a value "0" or "1".

The interface unit 11 receives the digital watermark-embedded video data from the processing unit 13, and outputs the digital watermark-embedded video data to the image display device such as a liquid crystal display. Alternatively, the interface unit 11 may transmit the digital watermark-embedded video data to other apparatus connected to the digital watermark embedding apparatus 1 via the communication network.

The storage unit 12 includes at least one device selected, for example, from among a semiconductor memory device, a magnetic disk device, and an optical disk device. The storage unit 12 stores a computer program to be executed on the digital watermark embedding apparatus 1 and various kinds of parameters to be used in order to embed the digital watermark information. Further, the digital watermark information and one or more images contained in the video data in which the digital watermark information is yet to be embedded may be temporarily stored in the storage unit 12 until the digital watermark-embedded video data is created by the processing unit 13. The storage unit 12 may further store the video data in which the digital watermark information has been embedded.

The processing unit 13 includes one or a plurality of processors, a memory circuit such as a random access memory, and their peripheral circuitry. The processing unit 13 embeds the digital watermark information into the video data. The processing unit 13 controls the entire operation of the digital watermark embedding apparatus 1.

Figure 2:
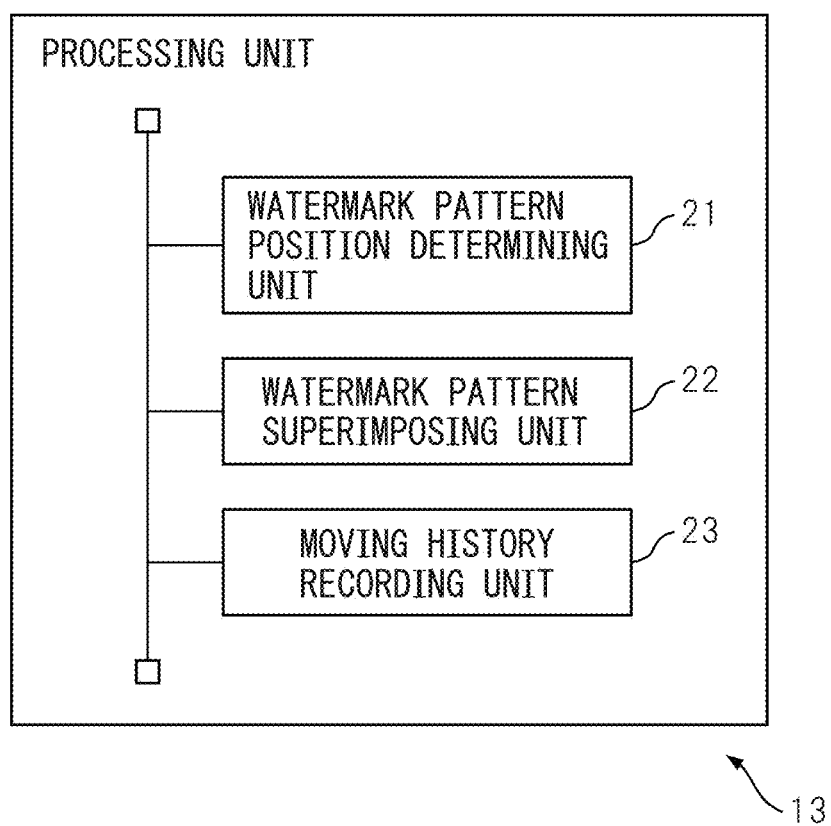
FIG. 2 is a block diagram illustrating the functions that a processing unit according to the first embodiment implements in order to embed digital watermark information into video data.

FIG. 2 is a block diagram illustrating the functions that the processing unit 13 implements in order to embed the digital watermark information into the video data. The processing unit 13 includes a watermark pattern position determining unit 21, a watermark pattern superimposing unit 22, and a moving history recording unit 23. These units constituting the processing unit 13 are functional modules implemented by executing a computer program on a processor incorporated in the processing unit 13. Alternatively, the watermark pattern position determining unit 21, the watermark pattern superimposing unit 22, and the moving history recording unit 23 may each be mounted as a separate operational circuit in the digital watermark embedding apparatus 1.

The processing unit 13 superimposes on each image in the video data a watermark pattern having a prescribed pattern that moves with time in a periodic fashion in accordance with the value of a symbol of interest contained in the digital watermark information.

In the present embodiment, the reference region having the same size and shape as the watermark pattern, for example, is defined on the image. The watermark pattern moves on the image, within its moving range containing at least a portion of the reference region, in such a manner as to cycle periodically between the state in which the watermark pattern overlaps the reference region and the state in which it does not overlap the reference region. Therefore, the presence of embedded digital watermark information is indicated by the fact that the average luminance value of the pixels contained in the reference region varies with time in a periodic fashion as the watermark pattern moves.

A plurality of symbols contained in the digital watermark information may be embedded into each image in the video data. In this case, a plurality of reference regions and watermark patterns are defined on each image contained in the video data. Then, one reference region and the watermark pattern that moves within the moving range containing the one reference region correspond to one symbol.

Further, in the present embodiment, the value of the symbol embedded in the video data defines the phase with which the average pixel value of the reference region varies with time. The average pixel value of the reference region cycles periodically between light and dark states as the area of the reference region superimposed by the watermark pattern varies with time.

For example, when the average pixel value of one reference region changes from light to dark and then to light at times t0, t1, and t2, respectively, the symbol is set to "0". When the average pixel value of another reference region changes from dark to light and then to dark at times t0, t1, and t2, respectively, the symbol is set to "1". By thus changing the phase according to how the average pixel value of the reference region varies with time, the processing unit 13 can change the value of the symbol to be embedded. Conversely, the symbol value may be set to "1" when the average pixel value of the reference region changes from light to dark and then to light, and to "0" when the average pixel value of the reference region changes from dark to light and then to dark.

In an alternative embodiment, the value of the symbol to be embedded in the video data may be set so as to define the moving direction of the watermark pattern. In this case, the watermark pattern position determining unit 21 sets the moving direction and moving range of the watermark pattern in accordance with the value of a symbol of interest contained in the digital watermark information.

For example, when the value of the symbol of interest is "1", the watermark pattern position determining unit 21 sets the moving range so that the watermark pattern moves in a vertical direction. On the other hand, when the value of the symbol of interest is "0", the watermark pattern position determining unit 21 sets the moving range so that the watermark pattern moves in a horizontal direction. Conversely, the watermark pattern position determining unit 21 may set the moving range so that the watermark pattern moves in a vertical direction when the value of the symbol of interest is "0", and set the moving range so that the watermark pattern moves in a horizontal direction when the value of the symbol of interest is "1".

Figure 3A:
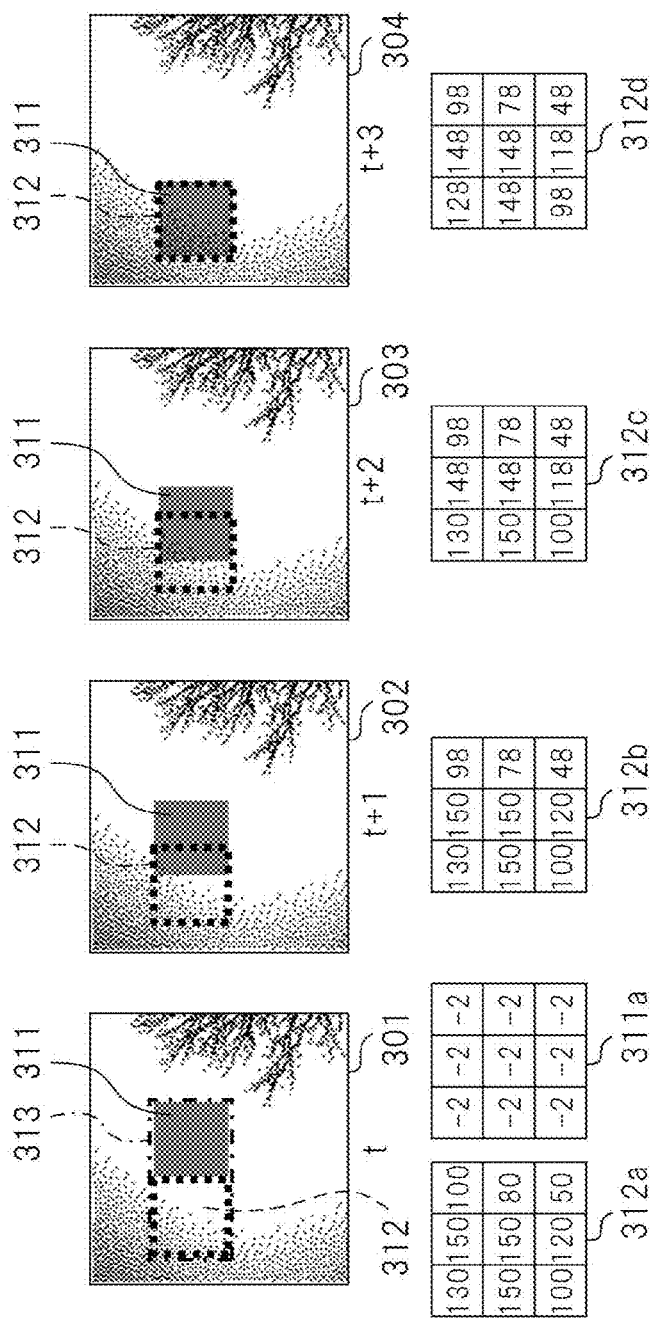
FIG. 3A is a diagram illustrating one example of the relationship between a reference region and a watermark pattern.

FIG. 3A is a diagram illustrating one example of the relationship between the reference region and the watermark pattern. The video data contains four images 301 to 304 corresponding to times t to (t+3), respectively. Block 311 on each image represents the watermark pattern, and region 312 enclosed by dashed lines indicates the reference region. Further, region 313 enclosed by semi-dashed lines defines the moving range of the watermark pattern. In the illustrated example, the watermark pattern 311 and the reference region 312 are each square in shape and formed by 3×3 pixels. An enlarged view 311a of the watermark pattern 311 depicts the values of the pixels contained in the watermark pattern. In the illustrated example, each pixel of the watermark pattern 311 has a value "−2", as indicated in its enlarged view 311a. Accordingly, the value of each pixel contained in the portion where the watermark pattern and the reference region overlap each other is given by subtracting "2" from the original value of the pixel.

In the image 301 at time t, the reference region 312 and the watermark pattern 311 do not overlap each other. In the image 302 at time (t+1), the rightmost column in the reference region 312 is overlapped with the watermark pattern 311. In the image 303 at time (t+2), the entire portion of the reference region 312, except the leftmost column thereof, is overlapped with the watermark pattern 311. In the image 304 at time (t+3), the reference region 312 and the watermark pattern 311 completely overlap each other.

Enlarged views 312a to 312d depict the values of the pixels contained in the reference region in the respective images. As can be seen from the enlarged views 312a to 312d, in the image 302 at time (t+1), the pixel values in the rightmost column in the reference region are smaller than the corresponding pixel values in the image 301 at time t by "2" that corresponds to the pixel value in the watermark pattern. In the image 303 at time (t+2), all of the pixel values in the reference region, except those in the leftmost column thereof, are smaller than the corresponding pixel values in the image 301 at time t by "2" that corresponds to the pixel value in the watermark pattern. In the image 304 at time (t+3), all the pixel values in the reference region are smaller than the corresponding pixel values in the image 301 at time t by "2" that corresponds to the pixel value in the watermark pattern.

Figure 3B:
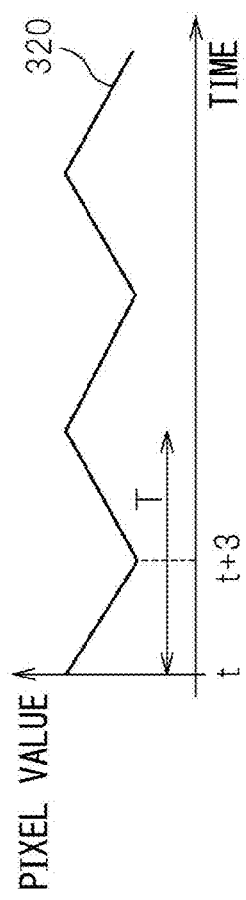
FIG. 3B is a graph depicting, in corresponding relationship to FIG. 3A, how the average pixel value of the reference region varies with time.

FIG. 3B is a graph depicting, in corresponding relationship to FIG. 3A, how the average pixel value of the reference region varies with time. In FIG. 3B, the abscissa represents the time, and the ordinate represents the pixel value. The graph 320 depicts how the average pixel value of the reference region varies with time. As along as the scene in the reference region does not change abruptly, it can be assumed that the values of the pixels contained in the portion of the reference region not superimposed by the watermark pattern will remain unchanged over the period of time corresponding to several to several tens of images. As a result, the average pixel value of the reference region varies with time in a periodic fashion as the watermark pattern moves. Even when the scene in the reference region changes rapidly, if there is no signal that oscillates with the same period as the period with which the watermark pattern moves, i.e., the period with which the average pixel value of the reference region varies, a spectrum having the same period as the moving watermark pattern can be observed in the Fourier spectrum. In the illustrated example, the average pixel value of the reference region varies with time in a triangular wave-like fashion in accordance with the period T with which the watermark pattern moves. At time t when the watermark pattern and the reference region do not overlap each other, the average pixel value of the reference region is the highest, and at time (t+3) when the watermark pattern and the reference region completely overlap each other, the average pixel value of the reference region is the lowest.

Figure 4A:
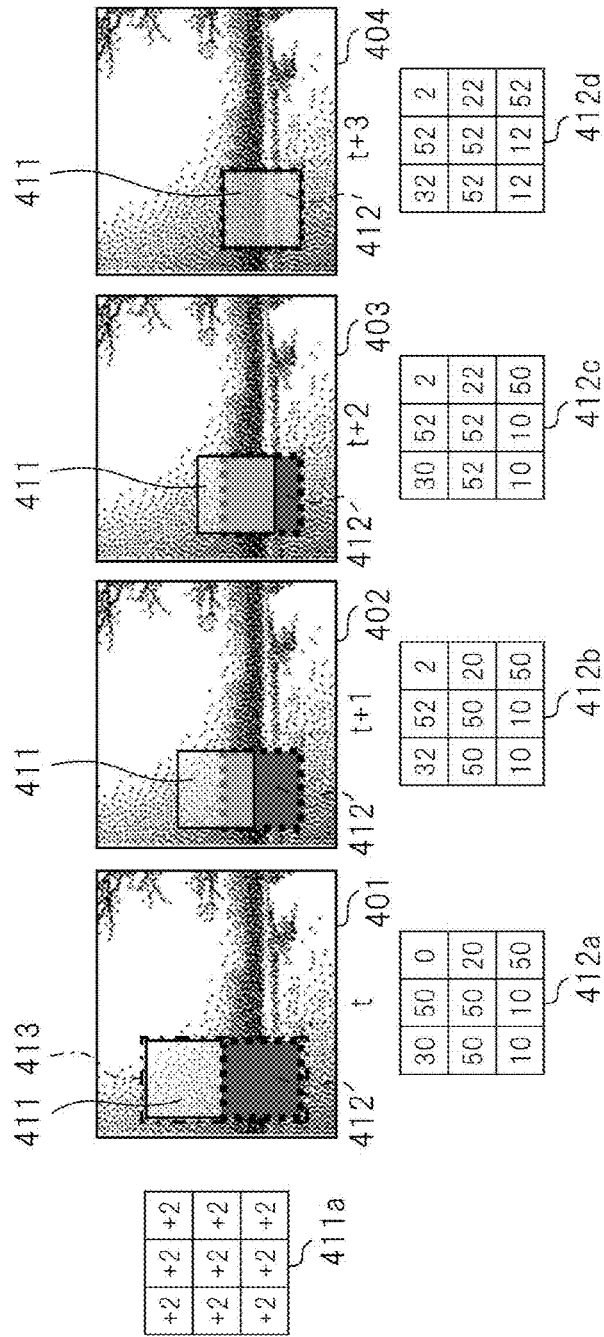
FIG. 4A is a diagram illustrating another example of the relationship between a reference region and a watermark pattern.

FIG. 4A is a diagram illustrating another example of the relationship between the reference region and the watermark pattern. The video data contains four images 401 to 404 corresponding to times t to (t+3), respectively. Block 411 on each image represents the watermark pattern, and region 412 enclosed by dashed lines indicates the reference region. Further, region 413 enclosed by semi-dashed lines defines the moving range of the watermark pattern. In this example also, the watermark pattern 411 and the reference region 412 are each square in shape and formed by 3×3 pixels. An enlarged view 411a of the watermark pattern 411 depicts the values of the pixels contained in the watermark pattern. In the illustrated example, each pixel of the watermark pattern 411 has a value "+2", as indicated in its enlarged view 411a. Accordingly, the value of each pixel contained in the portion where the watermark pattern and the reference region overlap each other is given by adding "2" to the original value of the pixel.

In the image 401 at time t, the reference region 412 and the watermark pattern 411 do not overlap each other. In the image 402 at time (t+1), the uppermost row in the reference region 412 is overlapped with the watermark pattern 411. In the image 403 at time (t+2), the entire portion of the reference region 412, except the lowermost row thereof, is overlapped with the watermark pattern 411. In the image 404 at time (t+3), the reference region 412 and the watermark pattern 411 completely overlap each other.

Enlarged views 412a to 412d depict the values of the pixels contained in the reference region in the respective images. As can be seen from the enlarged views 412a to 412d, in the image 402 at time (t+1), the pixel values in the uppermost row in the reference region are larger than the corresponding pixel values in the image 401 at time t by "2" that corresponds to the pixel value in the watermark pattern. In the image 403 at time (t+2), all of the pixel values in the reference region, except those in the lowermost row thereof, are larger than the corresponding pixel values in the image 401 at time t by "2" that corresponds to the pixel value in the watermark pattern. In the image 404 at time (t+3), all the pixel values in the reference region are larger than the corresponding pixel values in the image 401 at time t by "2" that corresponds to the pixel value in the watermark pattern.

Figure 4B:
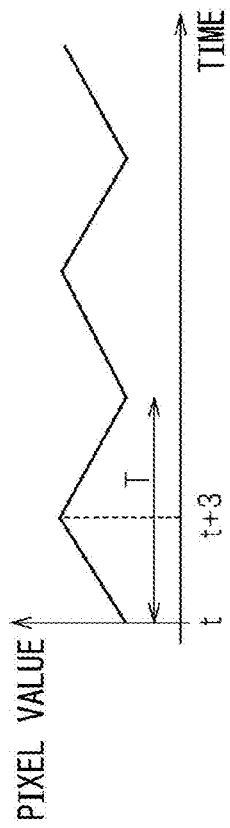
FIG. 4B is a graph depicting, in corresponding relationship to FIG. 4A, how the average pixel value of the reference region changes with time.

FIG. 4B is a graph depicting, in corresponding relationship to FIG. 4A, how the average pixel value of the reference region varies with time. In FIG. 4B, the abscissa represents the time, and the ordinate represents the pixel value. The graph 420 depicts how the average pixel value of the reference region varies with time. As can be seen, the average pixel value of the reference region varies with time in a periodic fashion as the watermark pattern moves. In the illustrated example, the average pixel value of the reference region varies with time in a triangular wave-like fashion in accordance with the period T with which the watermark pattern moves. At time t when the watermark pattern and the reference region do not overlap each other, the average pixel value of the reference region is the lowest, and at time (t+3) when the watermark pattern and the reference region completely overlap each other, the average pixel value of the reference region is the highest.

The watermark pattern position determining unit 21 may set the watermark pattern in the shape of a fan whose center angle is 270° and whose center is located at one of the corners of the reference region. In this case, the watermark pattern position determining unit 21 changes the direction in which the watermark pattern is rotated about its center in accordance with the value of the symbol of interest.

FIGS. 5A to 5F are diagrams illustrating one example of the relationship between the reference region and the watermark pattern when the watermark pattern is set in the shape of a fan as described above. In FIGS. 5A to 5F, a square region 501 enclosed by dashed lines represents the reference region, and a fan-shaped region 502 indicates the watermark pattern. The center 502a of the watermark pattern 502 is located at the lower right corner of the reference region 501. The moving range of the watermark pattern 502 is defined as a circular region centered around the center 502a of the watermark pattern 502 and having the same radius as the watermark pattern 502, regardless of the value of the symbol embedded.

Figure 5A:
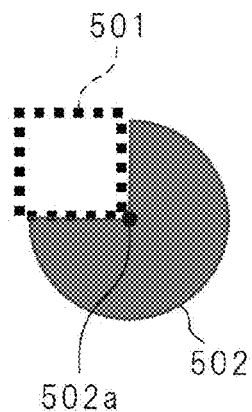
FIG. 5A is a diagram illustrating an alternative example of the relationship between a reference region and a watermark pattern.
Figure 5B:
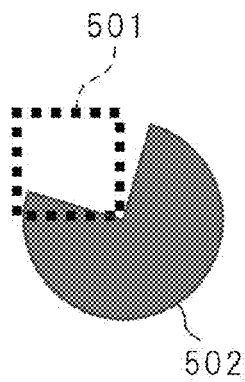
FIG. 5B is a diagram illustrating the alternative example of the relationship between the reference region and the watermark pattern.
Figure 5C:
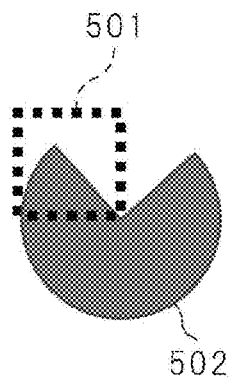
FIG. 5C is a diagram illustrating the alternative example of the relationship between the reference region and the watermark pattern.
Figure 5D:
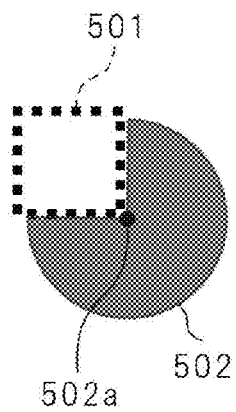
FIG. 5D is a diagram illustrating the alternative example of the relationship between the reference region and the watermark pattern.
Figure 5E:
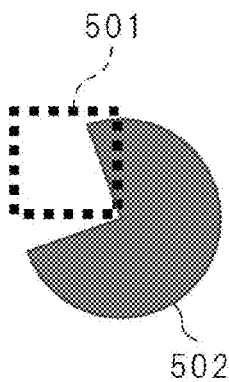
FIG. 5E is a diagram illustrating the alternative example of the relationship between the reference region and the watermark pattern.
Figure 5F:
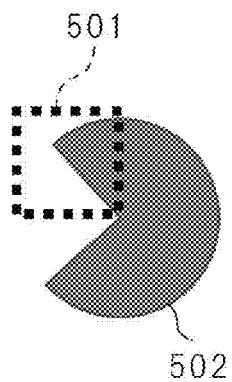
FIG. 5F is a diagram illustrating the alternative example of the relationship between the reference region and the watermark pattern.

When the value of the symbol embedded is "0", the watermark pattern position determining unit 21 rotates the watermark pattern in a clockwise direction in the order of FIGS. 5A to 5C. On the other hand, when the value of the symbol embedded is "1", the watermark pattern position determining unit 21 rotates the watermark pattern in a counterclockwise direction in the order of FIGS. 5D to 5F.

For each image of interest, the watermark pattern position determining unit 21 determines the position of the watermark pattern in the image, based on the position and the moving direction of the watermark pattern in the immediately preceding image and on a predetermined amount of movement. For this purpose, the watermark pattern position determining unit 21 receives from the moving history recording unit 23 the position of the watermark pattern in the immediately preceding image and a moving direction flag indicating the moving direction of the watermark pattern. Then, the watermark pattern position determining unit 21 determines the position of the watermark pattern in the image of interest by moving the watermark pattern from the position in the immediately preceding image by the predetermined amount of movement in the moving direction indicated by the moving direction flag.

For example, suppose that the moving range of the watermark pattern is defined as a region bounded on the left by the left edge of the reference region and on the right by the right edge of the watermark pattern when the watermark pattern is located with its left edge contacting the right edge of the reference region, as depicted in FIG. 3A. In this case, if the moving direction of the watermark pattern in the immediately preceding image is the rightward direction, the watermark pattern position determining unit 21 moves the watermark pattern to the right by the predetermined amount of movement, Δ, from the position of the watermark pattern in the immediately preceding image. Conversely, if the moving direction of the watermark pattern in the immediately preceding image is the leftward direction, the watermark pattern position determining unit 21 moves the watermark pattern to the left by the predetermined amount of movement, Δ, from the position of the watermark pattern in the immediately preceding image.

The watermark pattern position determining unit 21 notifies the watermark pattern superimposing unit 22 of the position of the watermark pattern in the image of interest. Further, the watermark pattern position determining unit 21 passes the position of the watermark pattern in the image of interest to the moving history recording unit 23 along with the moving direction flag indicating the moving direction of the watermark pattern. If the position of the watermark pattern in the image of interest is located at one or the other end of the moving range, the watermark pattern position determining unit 21 reverses the moving direction, and passes the moving flag indicating the reversed moving direction to the moving history recording unit 23 along with the position of the watermark pattern. For example, in the image of interest, if the watermark pattern is located at the left end of the moving range, this means that the watermark pattern has been moving leftward up to the current image; therefore, the watermark pattern position determining unit 21 sets the value to the moving direction flag to a value that indicates the rightward direction. Then, the watermark pattern position determining unit 21 passes the position of the watermark pattern to the moving history recording unit 23 along with the moving direction flag indicating the rightward direction.

Based on the position of the watermark pattern notified from the watermark pattern position determining unit 21, the watermark pattern superimposing unit 22 identifies the region on the image of interest that overlaps with the watermark pattern. Then, the watermark pattern superimposing unit 22 corrects the value of each pixel contained in the region overlapped with the watermark pattern by using the value of the corresponding pixel contained in the watermark pattern. For example, if each pixel contained in the watermark pattern has a value "−2", as previously depicted in FIG. 3A, the watermark pattern superimposing unit 22 subtracts "2" from the value of each pixel contained in the region overlapped with the watermark pattern.

In this case, the watermark pattern superimposing unit 22 may correct the values of the pixels contained only in the portion where the watermark pattern and the reference region overlap each other, by using the values of the corresponding pixels contained in the watermark pattern.

Figure 6:
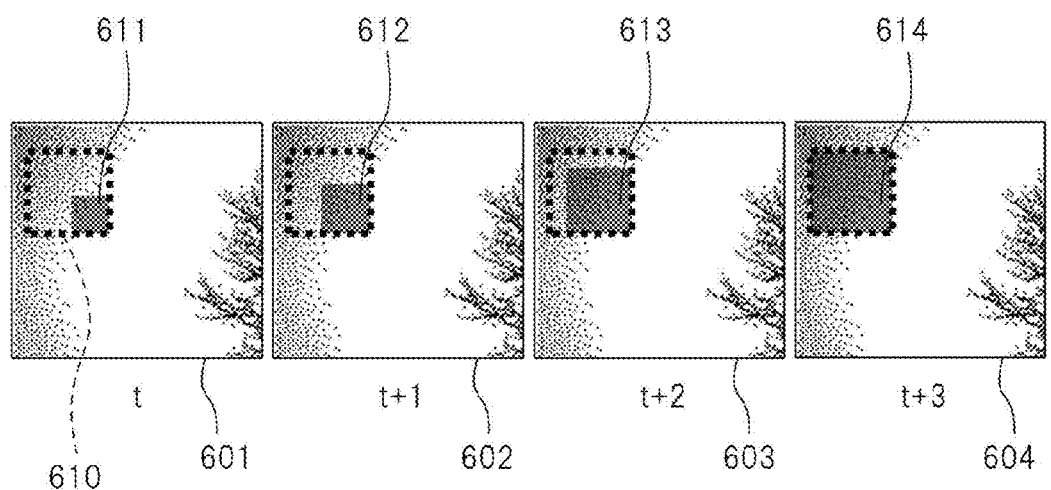
FIG. 6 is a diagram illustrating still another example of the relationship between a reference region and a watermark pattern.

FIG. 6 is a diagram illustrating still another example of the relationship between the reference region and the watermark pattern. In FIG. 6, images 601 to 604 correspond to times t, (t+1), (t+2), and (t+3), respectively. Region 610 enclosed by dashed lines in each image represents the reference region, and blocks 611 to 614 each indicate the portion where the watermark pattern overlaps the reference region. In the illustrated example, the moving range of the watermark pattern is set along a straight line joining the upper left and lower right corners of the reference region for a given symbol value (for example, "0"), and the watermark pattern moves with time in a periodic fashion within the moving range. In this case, when the symbol takes the other value, the watermark pattern moves along a straight line joining the upper right and lower left corner of the reference region.

In the images 601 to 603, the values of the pixels contained only in the respective portions 611 to 613 where the watermark pattern overlaps the reference region 610 are corrected in accordance with the values of the corresponding pixels contained in the watermark pattern. On the other hand, in the case of the image 604 in which the reference region is completely overlapped with the watermark pattern, the values of all of the pixels contained in the reference region are corrected in accordance with the values of the corresponding pixels contained in the watermark pattern.

By correcting the values of the pixels contained only in the portion where the watermark pattern and the reference region overlap each other, as described above, the number of pixels whose pixel values change due to the embedded digital watermark information can be reduced. The digital watermark information embedding apparatus 1 can thus suppress the degradation of image quality of the video data due to the presence of the embedded digital watermark information.

The moving history recording unit 23 outputs the position of the watermark pattern and the moving direction flag for one image and stores them in the storage unit 12. More specifically, each time the position of the watermark pattern and the moving direction flag are received from the watermark pattern position determining unit 21, the moving history recording unit 23 stores the position of the watermark pattern and the moving direction flag in the storage unit 12, replacing the previously stored position of the watermark pattern and the moving direction flag.

Alternatively, the moving history recording unit 23 may store the position of the watermark pattern and the moving direction flag in the memory circuit incorporated in the processing unit 13.

When a plurality of symbols are embedded in one image, the watermark pattern position determining unit 21, the watermark pattern superimposing unit 22, and the moving history recording unit 23 perform the above processing for the watermark pattern corresponding to each symbol.

Figure 7:
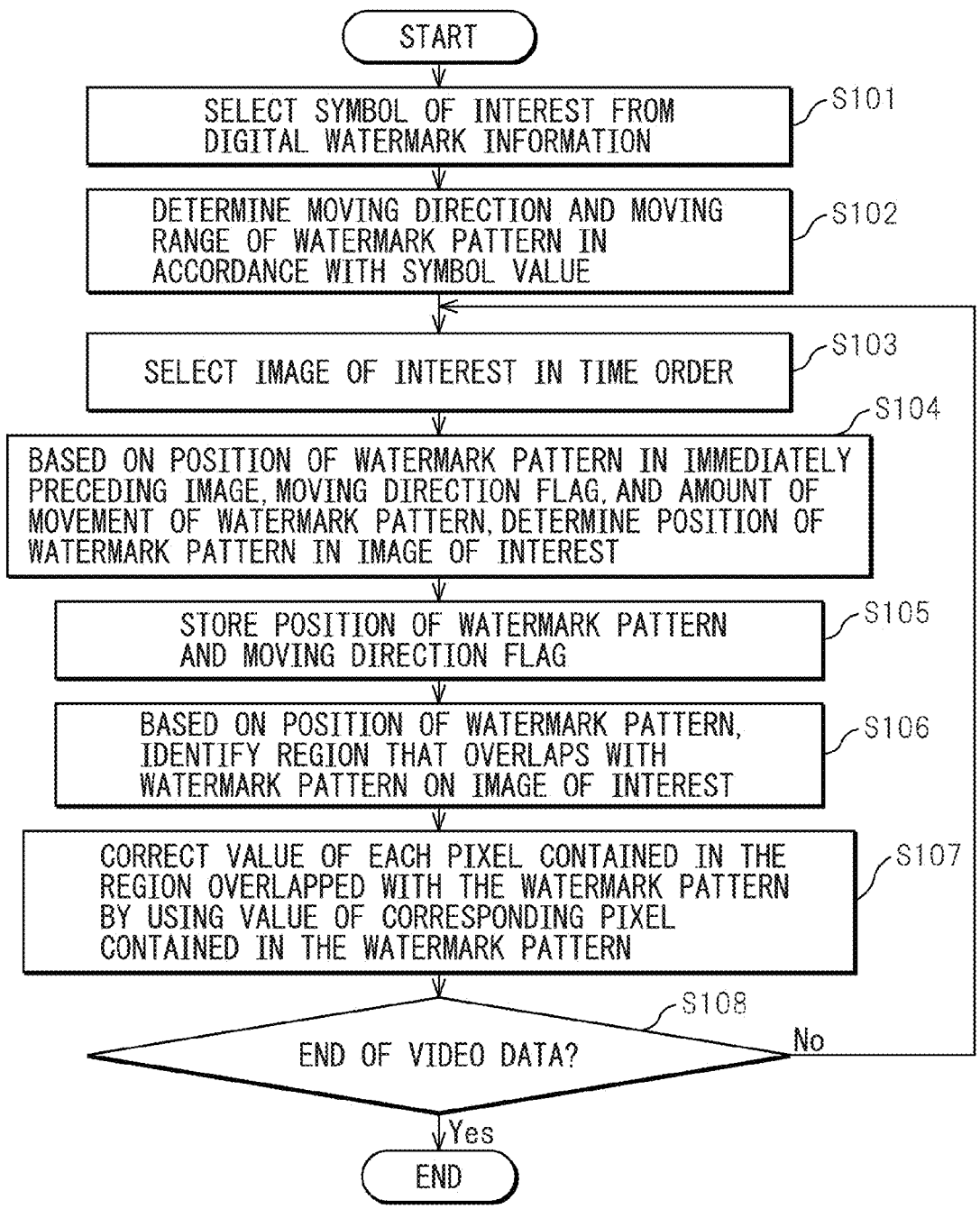
FIG. 7 is an operation flowchart illustrating a digital watermark embedding process performed under the control of a computer program executed on the processing unit in the digital watermark embedding apparatus according to the first embodiment.

FIG. 7 is an operation flowchart illustrating a digital watermark embedding process performed under the control of a computer program executed on the processing unit 13 in the digital watermark embedding apparatus 1. The processing unit 13 carries out the following digital watermark embedding process for each symbol contained in the digital watermark information.

The processing unit 13 selects a symbol of interest from among the symbols contained in the digital watermark information received via the interface unit 11 (step S101). Then, the watermark pattern position determining unit 21 in the processing unit 13 determines the moving direction or the phase of the moving period of the watermark pattern in accordance with the value of the symbol of interest contained in the digital watermark information (step S102). Since the average pixel value of the reference region varies as the watermark pattern moves, the phase of the moving period of the watermark pattern corresponds to the phase with which the average pixel value of the reference region varies with time. The phase of the moving period of the watermark pattern is defined, for example, by the initial position at which the watermark pattern is located. For example, in the case of a certain reference region, the initial position of the watermark pattern is set so that the watermark pattern completely covers the reference region, while in the case of another reference region, the initial position of the watermark pattern is set so that the watermark pattern does not overlap the reference region. In this case, the average pixel value of the reference region changes over time from dark to light and then to dark, or from light to dark and then to light, respectively, as the watermark pattern moves. As a result, the phase of the triangular wave representing the temporal variation of the average pixel value, as depicted in FIG. 3, differs by $\pi$ (rad) according to the initial position of the watermark pattern.

The watermark pattern position determining unit 21 selects an image of interest in time order (step S103). Then, based on the position of the watermark pattern in the immediately preceding image, the moving direction flag, and the predetermined amount of movement of the watermark pattern, the watermark pattern position determining unit 21 determines the position of the watermark pattern in the image of interest (step S104). If the specific image is the first image in the video data, the watermark pattern position determining unit 12 places the watermark pattern at one end of the moving range of the watermark pattern, and takes the direction directed from that one end to the other end of the moving range as the moving direction in that specific image.

The watermark pattern position determining unit 21 passes the position of the watermark pattern in the image of interest, along with its moving direction flag, to the moving history recording unit 23 in the processing unit 13, and the moving history recording unit 23 stores the position of the watermark pattern and the moving direction flag in the storage unit 12 (step S105). At the same time, the watermark pattern position determining unit 21 notifies of the watermark pattern superimposing unit 22 in the processing unit 13 the position of the watermark pattern.

Based on the position of the watermark pattern notified from the watermark pattern position determining unit 21, the watermark pattern superimposing unit 22 identifies the region that overlaps with the watermark pattern on the image of interest (step S106). Then, the watermark pattern superimposing unit 22 corrects the value of each pixel contained in the region overlapped with the watermark pattern by using the value of the corresponding pixel contained in the watermark pattern (step S107). As earlier described, the watermark pattern superimposing unit 22 may correct the values of the pixels contained only in the portion where the watermark pattern and the reference region overlap each other, by using the values of the corresponding pixels contained in the watermark pattern.

After that, the processing unit 13 determines whether the video data has ended (step S108). If the video data has not ended yet (No in step S108), the processing unit 13 repeats the process from step S103 to step S108.

When the video data has ended (Yes in step S108), the processing unit 13 terminates the digital watermark embedding process.

As has been described above, the digital watermark embedding apparatus causes the watermark pattern to move with time in a periodic fashion in accordance with the phase or the moving direction determined based on the value of the symbol of interest contained in the digital watermark information. Since the position of the watermark pattern is thus caused to change in a periodic fashion, the digital watermark embedding apparatus can suppress the "defocusing" phenomenon that may occur due to the presence of the digital watermark information. In this way, the digital watermark embedding apparatus can suppress the degradation of image quality due to the embedding of the digital watermark information, while making the presence of the embedded digital watermark difficult to be perceived by the viewer.

On the other hand, the digital watermark detection apparatus can determine the presence or absence of digital watermark information by just detecting the periodic variation of the average pixel value of the reference region from the video data into which the digital watermark information has been embedded by the digital watermark embedding apparatus. As a result, if the video data with the digital watermark information embedded therein is copied by means of analog capture, the digital watermark information will remain intact, as long as the reference region exists on the image of the copied video data. Further, the phase or the moving direction of the watermark pattern is determined in accordance with the value of the embedded symbol. As a result, if processing such as a frame rate conversion is applied to the video data in which the digital watermark information is embedded, the phase or the moving direction of the watermark pattern remains unchanged, so that the digital watermark detection apparatus can recover the embedded digital watermark information.

Next, a digital watermark embedding apparatus according to a second embodiment will be described.

The digital watermark embedding apparatus according to the second embodiment differs from the digital watermark embedding apparatus according to the first embodiment in that the processing unit applies a random transform to each image before superimposing the watermark pattern thereon. The following description therefore deals only with differences from the digital watermark embedding apparatus of the first embodiment.

Figure 8:
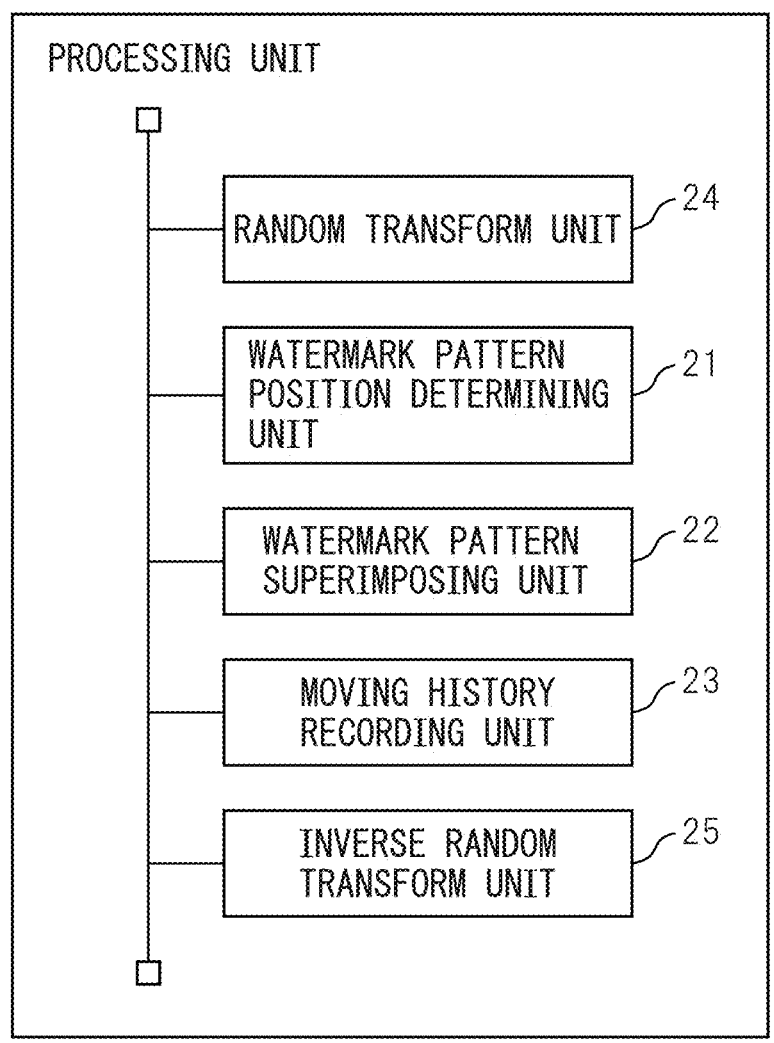
FIG. 8 is a block diagram illustrating the functions that a processing unit according to a second embodiment implements in order to embed digital watermark information into video data.

FIG. 8 is a block diagram illustrating the functions that the processing unit according to the second embodiment implements in order to embed the digital watermark information into video data. In FIG. 8, the functional units of the processing unit 14 that are identical to those of the processing unit 13 in the digital watermark embedding apparatus 1 of the first embodiment depicted in FIG. 2 are designated by the same reference numerals.

The processing unit 14 includes, in addition to the watermark pattern position determining unit 21, watermark pattern superimposing unit 22, and moving history recording unit 23, a random transform unit 24 and an inverse random transform unit 25.

The random transform unit 24, in accordance with a prescribed rule, rearranges the pixels on a block-by-block basis for each image contained in the video data. First, the random transform unit 24 divides each image into a plurality of blocks and assigns a unique number to each block. For example, the random transform unit 24 divides the image into a total of (m×n) blocks, that is, m blocks vertically and n blocks horizontally, and assigns numbers 1 to (m×n) to the respective blocks. Then, using an encryption key, the random transform unit 24 performs scrambling to rearrange the blocks. For this purpose, the random transform unit 24 constructs from the encryption key a mapping table that provides a mapping of block positions before and after the transformation. For example, suppose that the block position number after the transformation is designated by x, and the block position number before the transformation by y. Then, the block mapping equation used for the scrambling is given by the following equation.

$$y = (px) \bmod q \quad (1)$$

In equation (1), p and q are primes that the encryption key expresses.

Figures 9, 10:
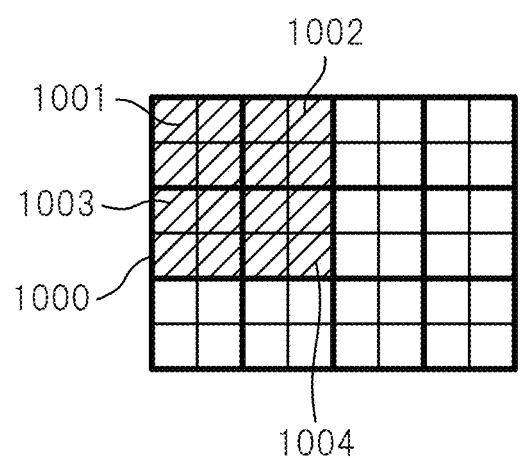
FIG. 9 is a diagram illustrating a mapping between block positions on a source image and block positions on a scrambled image.
FIG. 10 is a diagram illustrating one example of the relationship between watermark pattern size and scramble block size.

FIG. 9 depicts the mapping between the block positions on the source image and the block positions on the scrambled image for the case of p=7 and q=13 when the source image is divided into three blocks vertically and four blocks horizontally.

In FIG. 9, image 901 represents the source image, and image 901 is a random-transformed image produced by applying scrambling to the source image 901. The number contained in each block in the random-transformed image 902 indicates the number of that block in the source image 901. For example, from equation (1), when x is 1, the corresponding value of y is 7. Therefore, the random transform unit 24 performs scrambling so that the block whose block number y before the transformation is 7 is moved to the position of the block whose block number x after the transformation is 1.

Each block as a unit to which scrambling is applied to rearrange the pixel positions will hereinafter be called the scramble block.

The random transform unit 24 passes the random-transformed image to the watermark pattern superimposing unit 22.

The watermark pattern superimposing unit 22 superimposes the watermark pattern on the random-transformed image at the position determined by the watermark pattern position determining unit 21. At this time, the watermark pattern position determining unit 21 determines the phase or the moving direction of the watermark pattern and its moving range in the same manner as the first embodiment in accordance with the value of the symbol to be embedded in the video data. In the present embodiment, the reference region is defined on the random-transformed image. Accordingly, in order to detect the digital watermark information embedded in the video data, the digital watermark detection apparatus need only examine how the average pixel value of the reference region varies with time on the random-transformed image.

The watermark pattern superimposing unit 22 passes the random-transformed image with the watermark pattern superimposed thereon to the inverse random transform unit 25.

The inverse random transform unit 25 applies an inverse random transform to the random-transformed image with the watermark pattern superimposed thereon, and thereby reconstructs the image in which the digital watermark information is embedded. More specifically, the inverse random transform unit 25 applies descrambling, i.e., the inverse of the scrambling applied by the random transform unit 24, to the image with the watermark pattern superimposed thereon. Using the block position mapping equation (1) and the encryption key used for the scrambling, the inverse random transform unit 25 can determine the original position y in the encrypted image of the scramble block whose position in the scrambled image is x. The inverse random transform unit 25 can reconstruct the image by moving each scramble block in the image with the watermark pattern superimposed thereon to the thus determined original position of the scramble block.

Preferably, the scramble block size is set smaller than the size of the watermark pattern. By thus setting the scramble block size, the watermark pattern is divided into a plurality of sub-blocks in units of scramble blocks, and the sub-blocks are spread out across the image. This makes the presence of the embedded digital watermark information even more difficult to be perceived by the viewer. Furthermore, as the position of the watermark pattern changes, each specific portion of the watermark pattern overlaps with different scramble blocks before and after the moving of the watermark pattern. When the inverse random transform is applied, the scramble blocks move to the various different positions in accordance, for example, with the earlier given equation (1). As a result, when a plurality of temporally successive images, each with the watermark pattern superimposed thereon, are inverse random-transformed, each individual sub-block contained in the watermark pattern moves on the inverse random-transformed image in a seemingly irregular manner as time elapses.

The watermark pattern superimposing unit 22 may correct the values of the pixels in the sub-blocks contained only in the portion where the watermark pattern and the reference region overlap each other, by using the values of the corresponding pixels contained in the watermark pattern, as in the modified example of the first embodiment. In this case, the number of sub-blocks in the inverse random-transformed image changes as time elapses. As a result, the digital watermark embedding apparatus can better suppress the occurrence of the "defocusing" phenomenon in the video data in which the digital watermark pattern is embedded.

FIG. 10 is a diagram illustrating one example of the relationship between the watermark pattern size and the scramble block size. In the illustrated example, the watermark pattern 1000 has a size of four pixels horizontally and four pixels vertically. On the other hand, each scramble block has a size of two pixels horizontally and two pixels vertically. Accordingly, the watermark pattern 1000 is made up of four scramble blocks 1001 to 1004.

Figure 11:
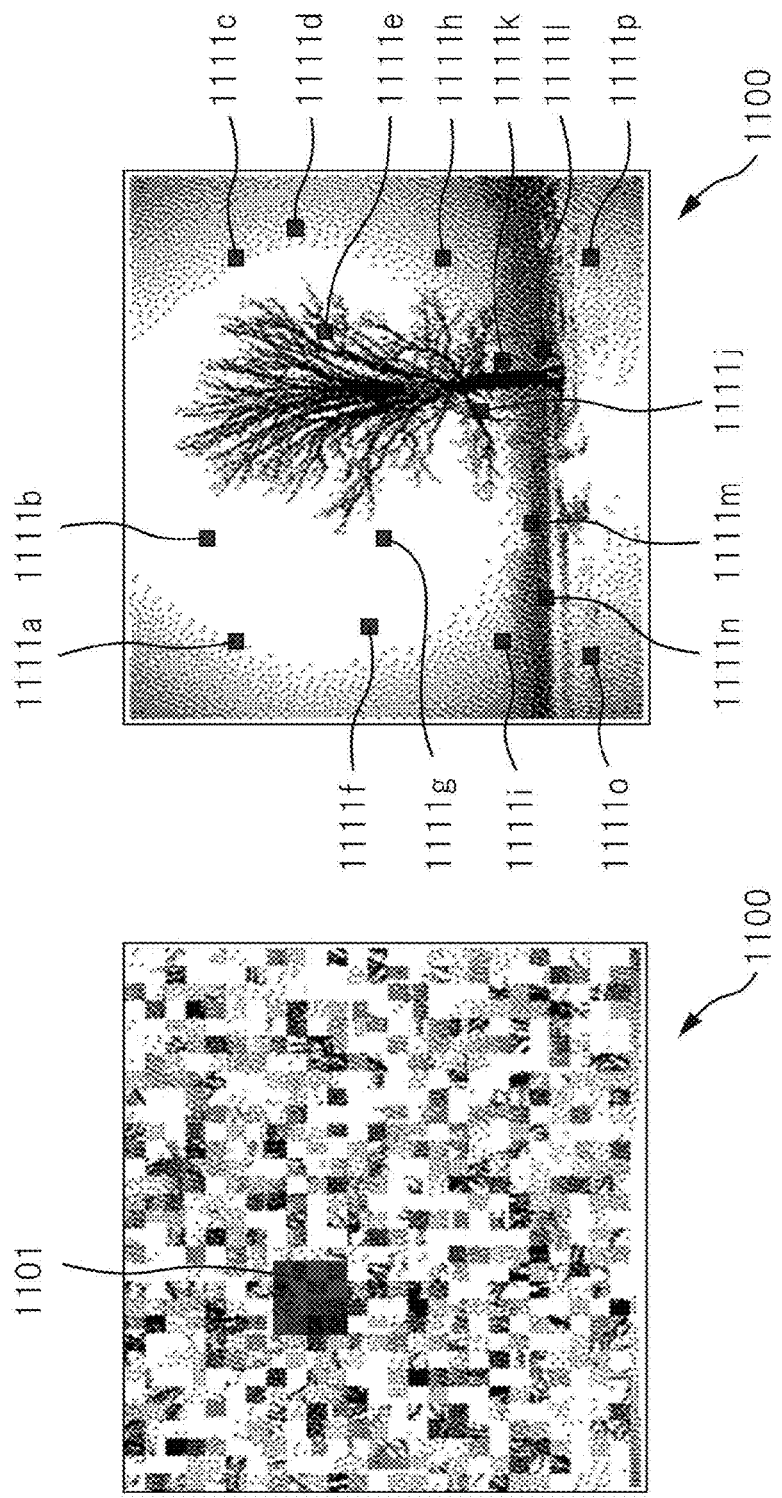
FIG. 11A is a diagram illustrating one example of a random-transformed image in which a watermark pattern is embedded.
FIG. 11B depicts an image obtained by inverse random-transforming the image of FIG. 11A.

FIG. 11A illustrates one example of a random-transformed image in which a watermark pattern is embedded, and FIG. 11B depicts an image obtained by inverse random-transforming the image of FIG. 11A.

One watermark pattern 1101 is superimposed on the random-transformed image depicted in FIG. 11A. The horizontal and vertical dimensions of the watermark pattern are four times the horizontal and vertical dimensions of one scramble block. In other words, the watermark pattern is made up of 16 scramble blocks. As a result, in the inverse random-transformed image 1110, the watermark pattern 1101 is divided into 16 sub-blocks 1111a to 1111p. The sub-blocks 1111a to 1111p are spread out across the entire image 1110. This makes it very difficult for the viewer to visually recognize the watermark pattern.

Figure 12:
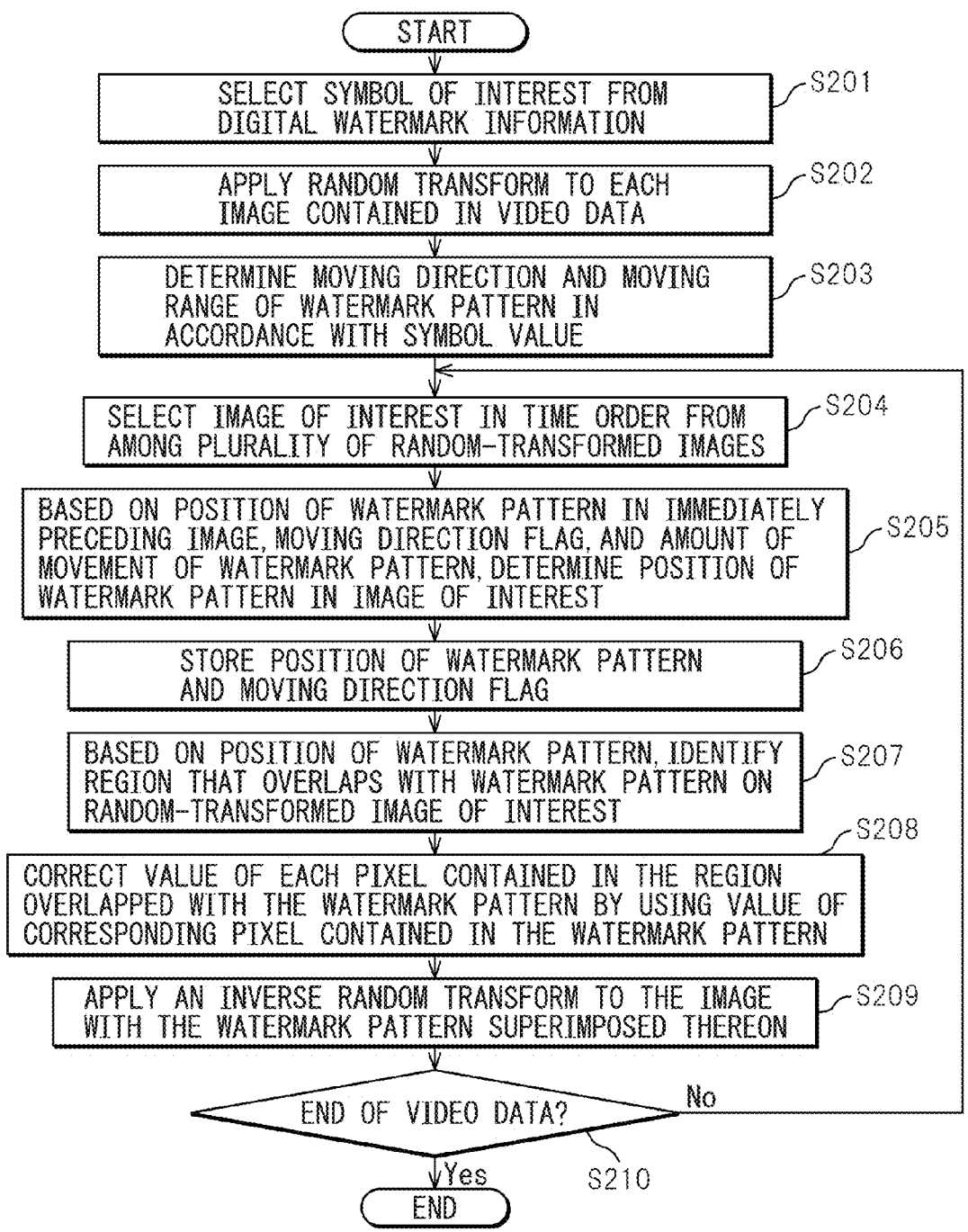
FIG. 12 is an operation flowchart illustrating a digital watermark embedding process performed under the control of a computer program executed on the processing unit in the digital watermark embedding apparatus according to the second embodiment.

FIG. 12 is an operation flowchart illustrating a digital watermark embedding process performed under the control of a computer program executed on the processing unit 14 in the digital watermark embedding apparatus. The processing unit 14 carries out the following digital watermark embedding process for each symbol contained in the digital watermark information.

The processing unit 14 selects a symbol of interest from among the symbols contained in the digital watermark information received via the interface unit 11 (step S201). Then, the random transform unit 24 in the processing unit 14 applies a random transform to each image contained in the video data in which the digital watermark information is to be embedded (step S202). The random transform unit 24 passes each random-transformed image to the pattern superimposing unit 22 in the processing unit 14.

The watermark pattern position determining unit 21 in the processing unit 14 determines the phase or the moving direction of the watermark pattern and its moving range in accordance with the value of the symbol of interest contained in the digital watermark information (step S203).

The watermark pattern position determining unit 21 selects an image of interest in time order from among the plurality of random-transformed images (step S204). Then, based on the position of the watermark pattern in the immediately preceding image, the moving direction flag, and the predetermined amount of movement of the watermark pattern, the watermark pattern position determining unit 21 determines the position of the watermark pattern in the image of interest (step S205).

The watermark pattern position determining unit 21 passes the position of the watermark pattern in the image of interest, along with its moving direction flag, to the moving history recording unit 23 in the processing unit 14, and the moving history recording unit 23 stores the position of the watermark pattern and the moving direction flag in the storage unit 12 (step S206). At the same time, the watermark pattern position determining unit 21 notifies of the watermark pattern superimposing unit 22 in the processing unit 14 the position of the watermark pattern.

Based on the position of the watermark pattern notified from the watermark pattern position determining unit 21, the watermark pattern superimposing unit 22 identifies the region that overlaps with the watermark pattern on the random-transformed image of interest (step S207). Then, the watermark pattern superimposing unit 22 corrects the value of each pixel contained in the region overlapped with the watermark pattern by using the value of the corresponding pixel contained in the watermark pattern (step S208). In this embodiment also, the watermark pattern superimposing unit 22 may correct the values of the pixels contained only in the portion where the watermark pattern and the reference region overlap each other, by using the values of the corresponding pixels contained in the watermark pattern. The watermark pattern superimposing unit 22 passes the image with the watermark pattern superimposed thereon to the inverse random transform unit 25 in the processing unit 14.

The inverse random transform unit 25 applies an inverse random transform to the image with the watermark pattern superimposed thereon (step S209).

After that, the processing unit 14 determines whether the video data has ended (step S210). If the video data has not ended yet (No in step S210), the processing unit 14 repeats the process from step S204 to step S210.

When the video data has ended (Yes in step S210), the processing unit 14 terminates the digital watermark embedding process.

As has been described above, the digital watermark embedding apparatus according to the second embodiment superimposes the watermark pattern after random-transforming the source image, and thereafter applies an inverse random-transform to the image on which the watermark pattern has been superimposed. As a result, since the position of the watermark pattern changes on the image in an irregular manner as time elapses, the digital watermark embedding apparatus can suppress the "defocusing" phenomenon that may occur due to the presence of the digital watermark information. In this way, the digital watermark embedding apparatus can suppress the degradation of image quality due to the embedding of the digital watermark information, while making the presence of the embedded digital watermark difficult to be perceived by the viewer.

In the digital watermark embedding apparatus according to the second embodiment, the inverse random transform unit in the processing unit may inverse random-transform only the sub-blocks contained in the watermark pattern. In this case, the watermark pattern superimposing unit in the processing unit identifies the region overlapped with the sub-blocks contained in the inverse random-transformed watermark pattern on the source image to which the random transform has not been applied. Then, the watermark pattern superimposing unit may correct the value of each pixel contained in the identified region by using the value of the corresponding pixel contained in the corresponding sub-block. Since this eliminates the need to random-transform the image, the digital watermark embedding apparatus according to the second embodiment can not only omit the function of the random transform unit from the processing unit but also reduce the amount of computation when embedding the digital watermark information.

Further, in the digital watermark embedding apparatus according to the second embodiment, the encryption key may be made different according to the value of the symbol to be embedded in the video data. In this case, the watermark pattern position determining unit generates the encryption key according to the value to be embedded, and passes the encryption key to the random transform unit and the inverse random transform unit. Then, the random transform unit performs scrambling by using the encryption key received from the watermark pattern position determining unit. On the other hand, the inverse random transform unit performs descrambling by using the encryption key received from the watermark pattern position determining unit.

The digital watermark detection apparatus then applies scrambling to the images by using encryption keys corresponding to the respective values that the embedded symbol can take. In this case, the digital watermark detection apparatus detects, from among the images to which the scrambling has been applied, an image from which the watermark pattern of prescribed shape has been successfully recovered, and determines that the value associated with the encryption key used for that image is the embedded value.

Next, a digital watermark embedding apparatus according to a third embodiment will be described. The digital watermark embedding apparatus according to the third embodiment differs from the digital watermark embedding apparatus according to the second embodiment in that the processing unit applies an orthogonal transform, rather than a random transform, to each image contained in the video data, and applies an inverse orthogonal transform to the image in which the watermark pattern is embedded. The following description therefore deals only with differences from the digital watermark embedding apparatus of the second embodiment.

Figure 13:
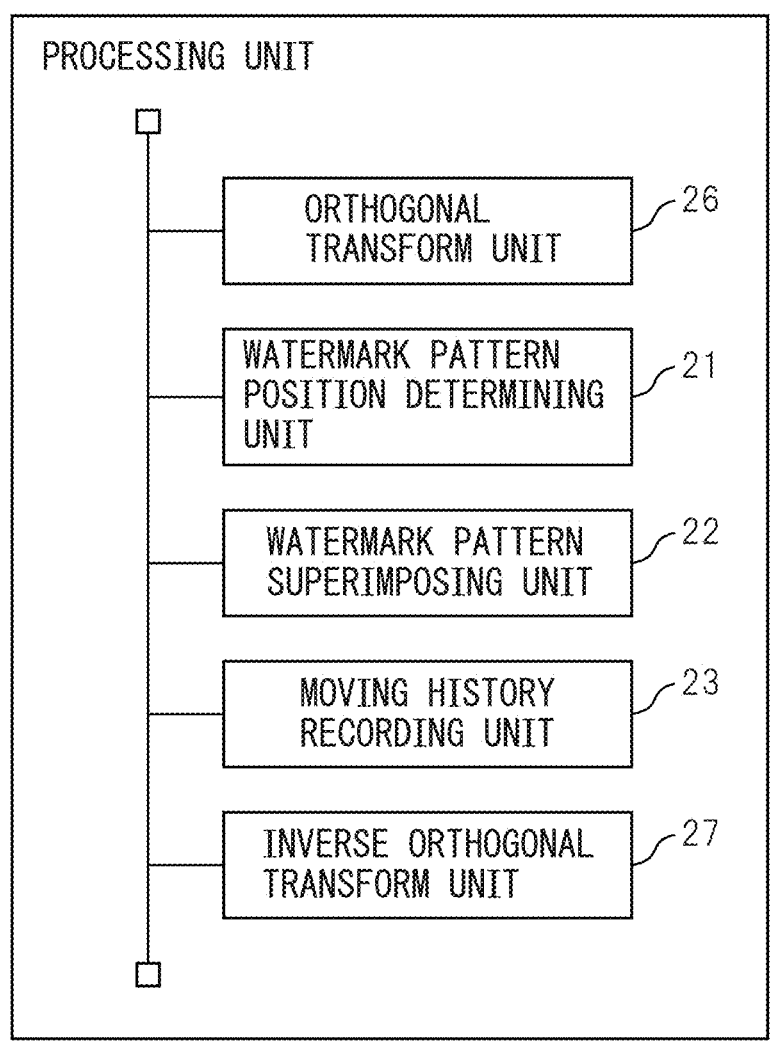
FIG. 13 is a block diagram illustrating the functions that a processing unit according to a third embodiment implements in order to embed digital watermark information into the video data.

FIG. 13 is a block diagram illustrating the functions that the processing unit according to the third embodiment implements in order to embed the digital watermark information into the video data. In FIG. 13, the functional units of the processing unit 15 that are identical to those of the processing unit 13 in the digital watermark embedding apparatus 1 of the first embodiment depicted in FIG. 2 are designated by the same reference numerals.

The processing unit 15 includes, in addition to the watermark pattern position determining unit 21, watermark pattern superimposing unit 22, and moving history recording unit 23, an orthogonal transform unit 26 and an inverse orthogonal transform unit 27.

The orthogonal transform unit 26 applies an orthogonal transform to each image. The orthogonal transform may be, for example, a Fourier transform, a discrete cosine transform, a Hadamard transform, or a wavelet transform. The orthogonal transform unit 26 passes the orthogonal-transformed image to the watermark superimposing unit 22.

The watermark pattern superimposing unit 22 superimposes the watermark pattern on the orthogonal-transformed image at the position determined by the watermark pattern position determining unit 21. At this time, the watermark pattern position determining unit 21 determines the phase or the moving direction of the watermark pattern and its moving range in the same manner as the first and second embodiments in accordance with the value of the symbol to be embedded in the video data. In the present embodiment, the reference region is defined on the orthogonal-transformed image.

Accordingly, in order to detect the digital watermark information embedded in the video data, the digital watermark detection apparatus need only examine how the average pixel value of the reference region varies with time on the orthogonal-transformed image.

The watermark pattern superimposing unit 22 passes the orthogonal-transformed image with the watermark pattern superimposed thereon to the inverse orthogonal transform unit 27.

The inverse orthogonal transform unit 27 applies an inverse orthogonal transform to the image with the watermark pattern superimposed thereon, and thereby reconstructs the image in which the digital watermark information is embedded. More specifically, the inverse orthogonal transform unit 27 transforms the image with the watermark pattern superimposed thereon by performing the inverse of the orthogonal transform applied by the orthogonal transform unit 26.

The operation flow of the digital watermark embedding process performed by the digital watermark embedding apparatus 3 according to the third embodiment is the same as the operation flow of the digital watermark embedding process according to the second embodiment illustrated in FIG. 12, except for the processing performed in steps S202 and S209. That is, in step S202, the orthogonal transform unit 26 applies an orthogonal transform to each image, and in step S209, the inverse orthogonal transform unit 27 applies an inverse orthogonal transform to the image in which the watermark pattern is embedded.

As has been described above, the digital watermark embedding apparatus according to the third embodiment superimposes the watermark pattern after orthogonal-transforming the source image, and thereafter applies an inverse orthogonal-transform to the image on which the watermark pattern has been superimposed. As a result, in the image embedded with the digital watermark information and inverse orthogonal-transformed by the digital watermark embedding apparatus, only the frequency component corresponding to the position where the watermark pattern is embedded differs from the corresponding frequency component in the source image. Accordingly, the digital watermark embedding apparatus can suppress the degradation of image quality due to the embedding of the digital watermark information, while making the presence of the embedded digital watermark difficult to be perceived by the viewer.

In each of the above embodiments, the value of each pixel in the watermark pattern may be a coefficient by which the pixel value is multiplied. In this case, the watermark pattern superimposing unit superimposes the watermark pattern by multiplying the value of each pixel contained in the region where the watermark pattern and the reference region overlap each other by the value of the corresponding pixel in the watermark pattern.

Further, the watermark pattern position determining unit may determine the position of the watermark pattern so that the average pixel value of the reference region varies sinusoidally with time, or the watermark pattern superimposing unit may vary the value of each pixel in the watermark pattern for each image on which the watermark pattern is superimposed.

Furthermore, the shape of the reference region is not limited to a square shape, but may be circular, equilateral triangular, or rectangular. According to another modified example, the digital watermark embedding apparatus according to each of the above embodiments may vary both the phase and the moving direction of the watermark pattern according to the value of the symbol to be embedded.

According to still another modified example, the number of values that one symbol can take may be three or more. In this case, as many moving directions are made possible for the watermark pattern as the number of values that one symbol can take. For example, when one symbol can take four possible values "0", "1", "2", and "3", the watermark pattern position determining unit sets "horizontal direction", "vertical direction", "direction from upper left to lower right", and "direction from upper right to lower left" as the possible moving directions for the watermark pattern for the respective values "0" to "3".

Alternatively, the watermark pattern position determining unit may determine the position of the watermark pattern for each image in the video data so that the average pixel value of the reference region monotonically increases or monotonically decreases. In this case, the watermark pattern is positioned so as to completely overlap the reference region at the start of the video data, and moves along a predefined direction (for example, from top to bottom or from left to right) as time elapses.

According to a further modified example, when each symbol is a bit, and the digital watermark information is represented by a bit sequence, the processing unit in the digital watermark embedding apparatus may apply error correction encoding to the bit sequence by using an error-correcting code or an error-detecting code. Then, the processing unit may embed the error-correction encoded symbol pattern into the video data. For example, the processing unit may use a cyclic redundancy check code (CRC) as an example of the error detecting code. Then, the processing unit may convert the bit sequence contained in the digital watermark information into a CRC code and may embed the CRC code into the video data. In this case, the average pixel value of the reference region need only be made to vary differently according to the embedded symbol value. When a plurality of CRC encoded symbols are embedded in one image, the digital watermark detection apparatus can determine the value of each embedded symbol without having to know the relationship between the phase of the temporal variation of the average pixel value of the reference region for the symbol and the value of the symbol. Likewise, the digital watermark detection apparatus can determine the value of each embedded symbol without having to know the relationship between the moving direction of the watermark pattern for the symbol and the value of the symbol. The digital watermark detection apparatus determines that, if the value yields a residue "0" when the bit sequence extracted from the video data is divided by the generating polynomial used to generate the CRC code, then that value is the embedded value.

For example, if it is assumed that the generating polynomial as the divisor is "1011" and that a bit sequence "111011" is contained in the digital watermark information, then the CRC code corresponding to that bit sequence is given as "1110011010". In this case, from the video data in which the digital watermark information is embedded, the digital watermark detection apparatus obtains the moving direction of each watermark pattern or the phase of the periodic temporal variation of the average pixel value of each reference region. Then, the digital watermark detection apparatus obtains two bit sequences "1110011010" and "0001100101" by assigning different symbol values to different moving directions or phases. Next, to determine whether the bit sequence extracted from the video data is "1110011010" or "0001100101", the digital watermark detection apparatus divides each of the two bit sequences by the divisor "1011". The digital watermark detection apparatus can then determine that "1110011010" that yields a residue "0" is the embedded bit sequence and, by removing the check bits "010" from that bit sequence, can obtain the embedded bit sequence.

According to a still further modified example, the digital watermark embedding apparatus may set a plurality of reference regions on each image in order to define the phase for the periodic temporal variation of the average pixel value of the reference region corresponding to each symbol value embedded in the image, and may set one of the reference regions as a specific reference region. Then, for the specific reference region, the watermark pattern position determining unit in the processing unit determines the position of the watermark pattern so that the watermark pattern moves constantly with a fixed periodicity within the moving range containing the specific reference region. The watermark pattern thus set for the specific reference region is hereinafter called the "reference pattern".

Then, for any other reference region to which the embedded symbol is assigned, the watermark pattern position determining unit determines the position of the watermark pattern so that the watermark pattern will also move with the same periodicity as the reference pattern. Further, the watermark pattern position determining unit determines the phase difference between the watermark pattern and the reference pattern, i.e., the phase difference between the temporal variation of the average pixel value of the reference region and the temporal variation of the average pixel value of the specific reference region, according to the value of the symbol to be embedded. In this case, the phase of the temporal variation of each reference region is defined by the phase difference relative to the phase of the temporal variation of the average pixel value of the specific reference region.

Figure 14A:
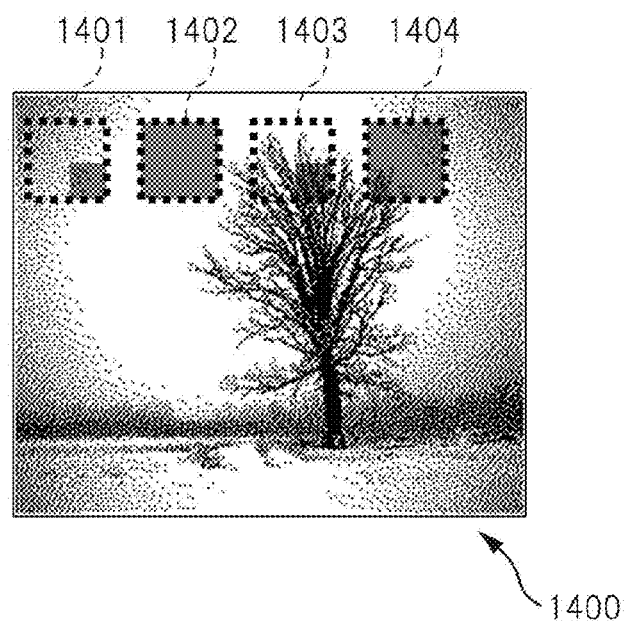
FIG. 14A is a diagram illustrating one example of an image on which a plurality of reference regions including a specific reference region have been defined.
Figure 14B:
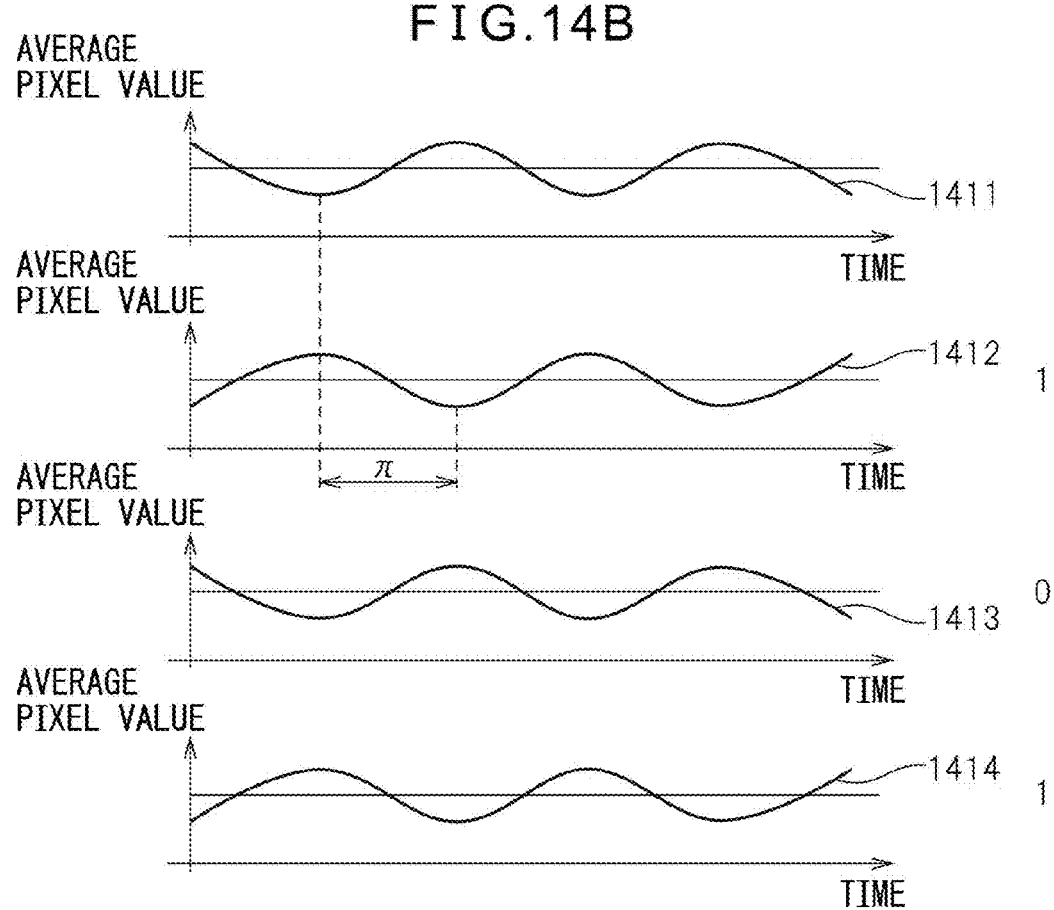
FIG. 14B is a diagram of graphs each illustrating an example of how the average pixel value of each reference region defined on the image of FIG. 14A varies with time.

FIG. 14A is a diagram illustrating one example of an image on which a plurality of reference regions including the specific reference region have been defined, and FIG. 14B is a diagram of graphs each illustrating an example of how the average pixel value of each reference region defined on the image of FIG. 14A varies with time.

Four reference regions 1401 to 1404 are defined on the image 1400 of FIG. 14A. Of these reference regions, the region 1401 is the specific reference region.

In each graph depicted in FIG. 14B, the abscissa represents the elapsed time, and the ordinate represents the average pixel value of the reference region. The graph 1411 at the top depicts how the average pixel value of the specific reference region 1401 varies with time. The graphs 1412 to 1414 depict how the average pixel values of the reference regions 1402 to 1404, respectively, vary with time.

In the illustrated example, in the reference region 1403 whose average pixel value varies in phase with the average pixel value of the specific reference region, "0" is set as the value of the symbol embedded. On the other hand, in the reference regions 1402 and 1404 each of whose average pixel values varies π out of phase with the average pixel value of the specific reference region, "1" is set as the value of the symbol embedded.

Next, a description will be given of digital watermark detection apparatus for detecting the digital watermark information embedded by the digital watermark embedding apparatus according to the above embodiments or their modified examples.

Figure 15:
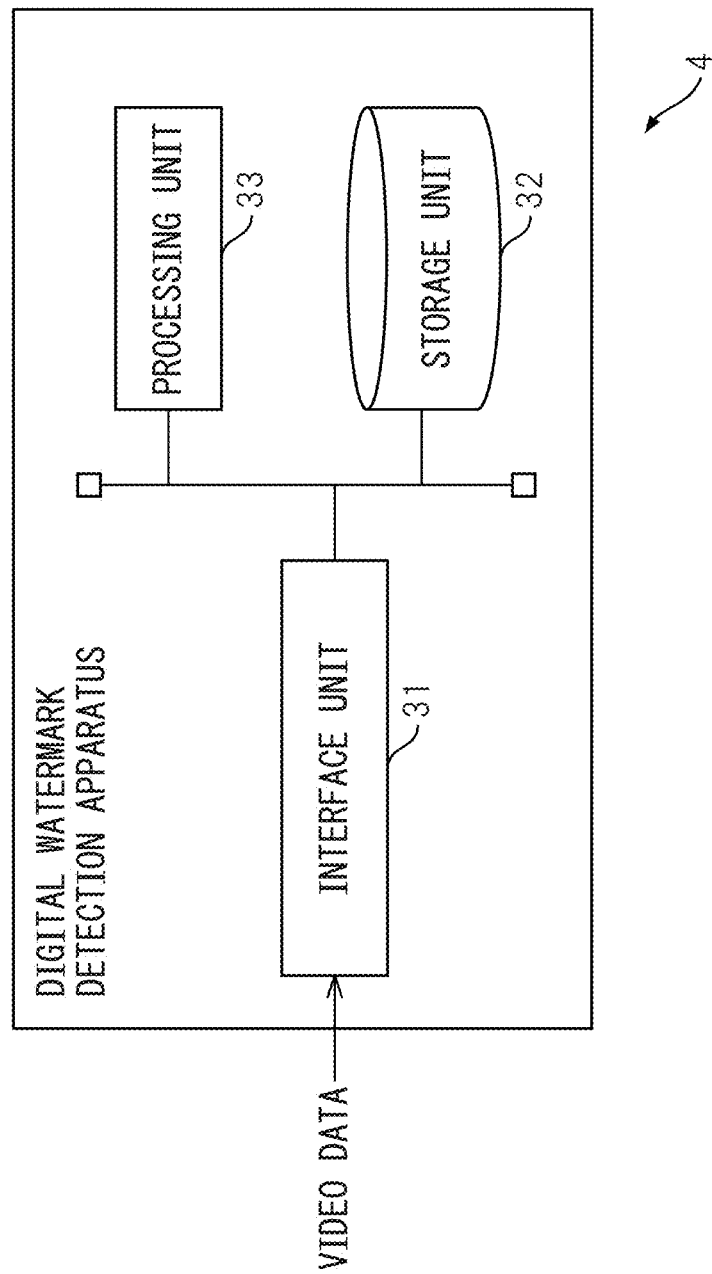
FIG. 15 is a diagram illustrating in simplified form the configuration of a digital watermark detection apparatus according to one embodiment.

FIG. 15 is a diagram illustrating in simplified form the configuration of a digital watermark detection apparatus according to one embodiment. The digital watermark detection apparatus 4 includes an interface unit 31, a storage unit 32, and a processing unit 33. The digital watermark detection apparatus 4 detects the digital watermark information embedded in the video data acquired via the interface unit 31.

The interface unit 31 includes a video signal interface for connecting the digital watermark detection apparatus 4, for example, to a moving image input device such as a camcorder (not depicted), and a control circuit for the video signal interface. Alternatively, the interface unit 31 may include a communication interface for connecting the digital watermark detection apparatus 4 to a communication network conforming to a communication standard such as the Ethernet (registered trademark), and a control circuit for the communication interface.

The interface unit 31 acquires video data from the moving image input device or via the communication network, and passes the video data to the processing unit 33.

Further, the interface unit 31 may receive the detected digital watermark information from the processing unit 33 and transmit the digital watermark information to other apparatus connected to the digital watermark detection apparatus 4 via the communication network.

The storage unit 32 includes at least one device selected, for example, from among a semiconductor memory device, a magnetic disk device, and an optical disk device. The storage unit 32 stores a computer program to be executed on the digital watermark detection apparatus 4 and various kinds of parameters to be used in order to detect the digital watermark information embedded in the video data. For example, the storage unit 32 stores templates representing the position and range of the reference region and the frequency component corresponding to the temporal variation period of the average pixel value of the reference region, and a mapping table that provides a mapping between the moving direction of the watermark pattern and the embedded value. The storage unit 32 may also store the detected digital watermark information. The storage unit 32 may further store the video data in which the digital watermark information is embedded.

The processing unit 33 includes one or a plurality of processors, a memory circuit such as a random access memory, and their peripheral circuitry. The processing unit 33 detects the digital watermark information embedded in the video data. Further, the processing unit 33 controls the entire operation of the digital watermark detection apparatus 4.

Figure 16:
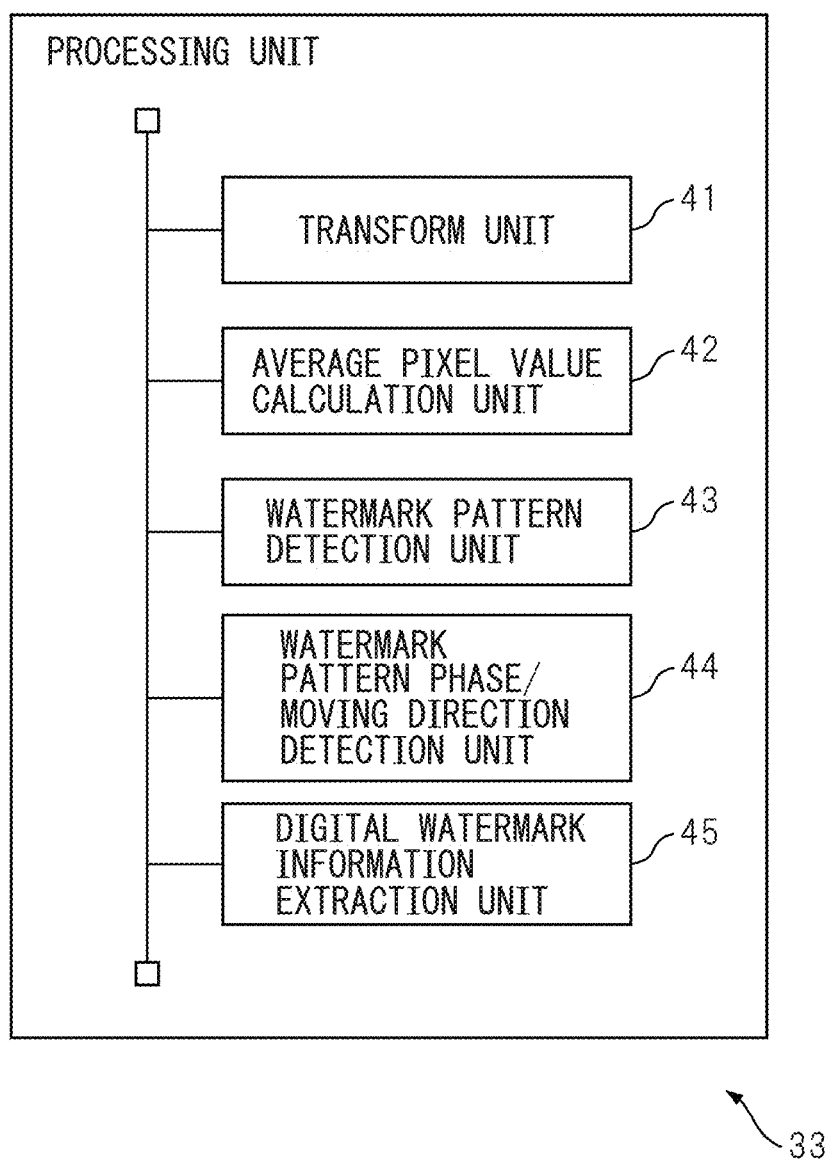
FIG. 16 is a block diagram illustrating the functions that a processing unit in the digital watermark detection apparatus implements in order to detect digital watermark information on video data.

FIG. 16 is a block diagram illustrating the functions that the processing unit implements in order to detect the digital watermark information on the video data.

The processing unit 33 includes a transform unit 41, an average pixel value calculation unit 42, a watermark pattern detection unit 43, a watermark pattern phase/moving direction detection unit 44, and a digital watermark information extraction unit 45. The processing unit 33 acquires video data via the interface unit, for example, from a camcorder that captured the video data in which the digital watermark information is embedded or from some other apparatus that stores the video data. Then, the processing unit 33 detects the embedded digital watermark information by analyzing the video data.

The transform unit 41 receives the images contained in the video data, in which the digital watermark information is embedded, from the processing unit 33 in time series order. Then, the transform unit 41 corrects each image for image distortions caused by the distortion aberrations of the imaging optics of the image pickup device used to capture the video data. For this purpose, the transform unit 41 first detects a region that actually contains a moving image on the image. For convenience, the region that actually contains a moving image will hereinafter be referred to as the moving-image region.

To detect the moving-image region, the transform unit 41 detects edges on the image, for example, by using a Sobel filter or a Laplacian filter. Then, the transform unit 41 determines that, of the edges extending substantially in the horizontal direction, for example, the longest edge in the upper half of the image represents the upper edge of the moving-image region. Likewise, the transform unit 41 determines that, of the edges extending substantially in the horizontal direction, the longest edge in the lower half of the image represents the lower edge of the moving-image region. Further, the transform unit 41 determines that, of the edges extending substantially in the vertical direction, for example, the longest edge in the left half of the image represents the left edge of the moving-image region, and the longest edge in the right half of the image represents the right edge of the moving-image region. If the length of the longest edge extending substantially in the horizontal direction in the upper half of the image is, for example, one half or less of the horizontal width of the image, the transform unit 41 may determine that the upper edge of the image represents the upper edge of the moving-image region. Likewise, if the length of the longest edge extending substantially in the horizontal direction in the lower half of the image is, for example, one half or less of the horizontal width of the image, the transform unit 41 may determine that the lower edge of the image represents the lower edge of the moving-image region. Further, if the length of the longest edge extending substantially in the vertical direction in the left half of the image is, for example, one half or less of the vertical height of the image, the transform unit 41 may determine that the left edge of the image represents the left edge of the moving-image region. Likewise, if the length of the longest edge extending substantially in the vertical direction in the right half of the image is, for example, one half or less of the vertical height of the image, the transform unit 41 may determine that the right edge of the image represents the right edge of the moving-image region.

The transform unit 41 geometrically transforms the moving-image region so that the upper and lower edges of the moving-image region become mutually parallel straight lines and the left and right edges also become mutually parallel straight lines. If the processing unit 33 can acquire data on the distortion aberrations of the imaging optics of the image pickup device used to capture the video data in which the digital watermark information is embedded, the moving-image region may be nonlinearly geometrically transformed so as to cancel out the distortion aberrations.

Further, the transform unit 41 may resample the moving-image region so that the numbers of pixels in the horizontal and vertical directions in the moving-image region become equal to the numbers of pixels in the horizontal and vertical directions in each image contained in the video data in which the digital watermark information is embedded.

The transform unit 41 generates a transformed image by applying to the moving-image region the same transformation as that applied by the transform unit in the digital watermark embedding apparatus. For example, when each image is random-transformed by the digital watermark embedding apparatus, the transform unit 41 random-transforms the moving-image region detected from each image. When only the watermark pattern is inverse random-transformed, the transform unit 41 random-transforms the moving-image region by performing the inverse of the inverse random-transform applied to the watermark pattern. On the other hand, when each image is orthogonal-transformed by the digital watermark embedding apparatus, the transform unit 41 also orthogonal-transforms the moving-image region.

The transform unit 41 passes the thus transformed images to the average pixel value calculation unit 42 and the watermark pattern phase/moving direction detection unit 44 in time series order.

When the watermark pattern is directly superimposed on each image contained in the video data, as in the case of the video data generated by the digital watermark embedding apparatus according to the first embodiment, the transform unit 41 takes the moving-image region as the transformed image.

The average pixel value calculation unit 42 identifies a region predefined as the reference region on each of the transformed images received in time series order. Then, the average pixel value calculation unit 42 calculates the average pixel value of the reference region. If a plurality of reference regions are defined on one image, the average pixel value calculation unit 42 calculates the average pixel value for each reference region.

The average pixel value calculation unit 42 passes the average pixel value of the reference region identified on each transformed image and the position of the reference region to the watermark pattern detection unit 43 in time series order.

The watermark pattern detection unit 43 determines whether or not the watermark pattern is superimposed on the transformed image by detecting the temporal variation of the average pixel value for each reference region.

Since the watermark pattern moves in a periodic fashion, as earlier described, the temporal variation of the average pixel value of the reference region has frequency components along the time axis that correspond to the moving period of the watermark pattern. For example, when the average pixel value of the reference region varies in a triangular-wave fashion along the time axis, the frequency of the average pixel value along the time axis contains frequency components specific to the triangular wave. In view of this, for each reference region of interest, the watermark pattern detection unit 43 creates a one-dimensional vector by arranging the average pixel value of the reference region in time series order, and applies a Fourier transform to the one-dimensional vector. Then, from the thus obtained frequency components, the watermark pattern detection unit 43 extracts only the spectrum of the same frequency as the triangular wave. If the extracted spectrum is close in value to the spectrum of the triangular wave (for example, within a range of one half to two times the spectrum of the triangular wave), the watermark pattern detection unit 43 determines that the watermark pattern is superimposed on the reference region of interest. On the other hand, if the extracted spectrum is significantly different from the spectrum of the triangular wave (for example, more than two times), it is determined that a signal having the same period of the triangular wave is superimposed on the image. This means that the watermark symbol extracted from that reference position may contain an error. At this time, the watermark pattern detection unit 43 may notify the watermark pattern phase/moving direction detection unit 44 that the watermark has been lost.

Alternatively, for each reference region of interest, the watermark pattern detection unit 43 obtains the difference in average pixel value between two temporally successive transformed images. Then, if the difference varies with time in a periodic fashion, the watermark pattern detection unit 43 may determine that the watermark pattern is superimposed on the reference region of interest.

The watermark pattern detection unit 43 notifies the watermark pattern phase/moving direction detection unit 44 of the position of the reference region for which it is determined that the watermark pattern is superimposed.

The watermark pattern phase/moving direction detection unit 44 detects either or both of the phase of the temporal variation of the average pixel value and the moving direction of the watermark pattern on the reference region for which it is determined by the watermark pattern detection unit 43 that the watermark pattern is superimposed.

For this purpose, the watermark pattern phase/moving direction detection unit 44 checks all possible phases or moving directions that may be set in the reference region. To check the phase, the watermark pattern phase/moving direction detection unit 44 creates a one-dimensional vector by arranging the average pixel value of the reference region in time series order, and detects the phase for the temporal variation of the average pixel value.

To detect the moving direction, the watermark pattern phase/moving direction detection unit 44 obtains the difference in pixel value between adjacent pixels along the moving direction. Then, the watermark pattern phase/moving direction detection unit 44 determines that the moving direction in which the difference value varies with time is the moving direction that has been set for the watermark pattern.

For example, when the value of the embedded symbol is "1", it is determined that the moving direction set for the watermark pattern is the vertical direction, and when the value of the embedded symbol is "0", it is determined that the moving direction set for the watermark pattern is the horizontal direction. In this case, to determine whether the moving direction is the horizontal direction or not, the watermark pattern phase/moving direction detection unit 44 obtains the average pixel value for each vertical column within the reference region on each image, and takes the difference in average pixel value between adjacent columns as representing the difference value for the vertical direction. Further, to determine whether the moving direction is the vertical direction or not, the watermark pattern phase/moving direction detection unit 44 obtains the average pixel value for each horizontal row within the reference region on each image, and takes the difference in average pixel value between adjacent rows as representing the difference value for the horizontal direction. Then, the watermark pattern phase/moving direction detection unit 44 determines that the watermark pattern is moving along the vertical or horizontal direction, whichever direction along which the difference value varies with time.

When the phase of the temporal variation of the average pixel value of the reference region is defined by the phase difference relative to the phase of the temporal variation of the average pixel value of the specific reference region, the watermark pattern phase/moving direction detection unit 44 obtains that phase difference. For this purpose, the watermark pattern phase/moving direction detection unit 44 creates one-dimensional vectors by arranging in time series order the average pixel value of the reference region and the average pixel value of the specific reference region, respectively, and detects their phases. Then, the watermark pattern phase/moving direction detection unit 44 obtains the difference between the phase of the temporal variation of the average pixel value of the reference region and the phase of the temporal variation of the average pixel value of the specific reference region.

The watermark pattern phase/moving direction detection unit 44 notifies the digital watermark information extraction unit 45 of the moving direction of the watermark pattern and the phase of the temporal variation of the average pixel value or the phase difference.

The digital watermark information extraction unit 45 computes possible symbol patterns from the phase of the temporal variation of the average pixel value of each reference region. For example, when the symbol is a bit, the digital watermark information extraction unit 45 creates two patterns by setting the symbol in each reference region to "0" or "1", respectively, for the same phase. Then, the digital watermark information extraction unit 45 selects the symbol pattern that is judged to be error free by a CRC check. For example, when the phases at three reference positions are different, such as 0 degree, 180 degrees (π rad), and 0 degree, respectively, the possible symbol patterns are (0, 1, 0) and (1, 0, 1). As earlier described, the determination as to which pattern is the correct symbol pattern can be made by also embedding CRC parity check bits in advance as a watermark symbol and by computing the CRC parity when making a symbol decision. Alternatively, when the phase of the temporal variation of the average pixel value of each reference region is defined by the phase difference relative to the phase of the temporal variation of the average pixel value of the specific reference region, the digital watermark information extraction unit 45 retrieves from the storage unit 32 a mapping table that provides a mapping between the phase difference and the symbol value. Then, by referring to the mapping table, the digital watermark information extraction unit 45 obtains the value corresponding to the phase difference detected by the watermark pattern phase/moving direction detection unit 44.

Alternatively, the digital watermark information extraction unit 45 retrieves from the storage unit 32 a mapping table that provides a mapping between the moving direction of the watermark pattern and the embedded symbol value. Then, by referring to the mapping table, the digital watermark information extraction unit 45 obtains the value corresponding to the moving direction of the watermark pattern detected by the watermark pattern phase/moving direction detection unit 44. The digital watermark information extraction unit 45 determines that the obtained value is the embedded symbol value. By obtaining the embedded symbol values in time series order, the digital watermark information extraction unit 45 reconstructs the digital watermark information.

Figure 17:
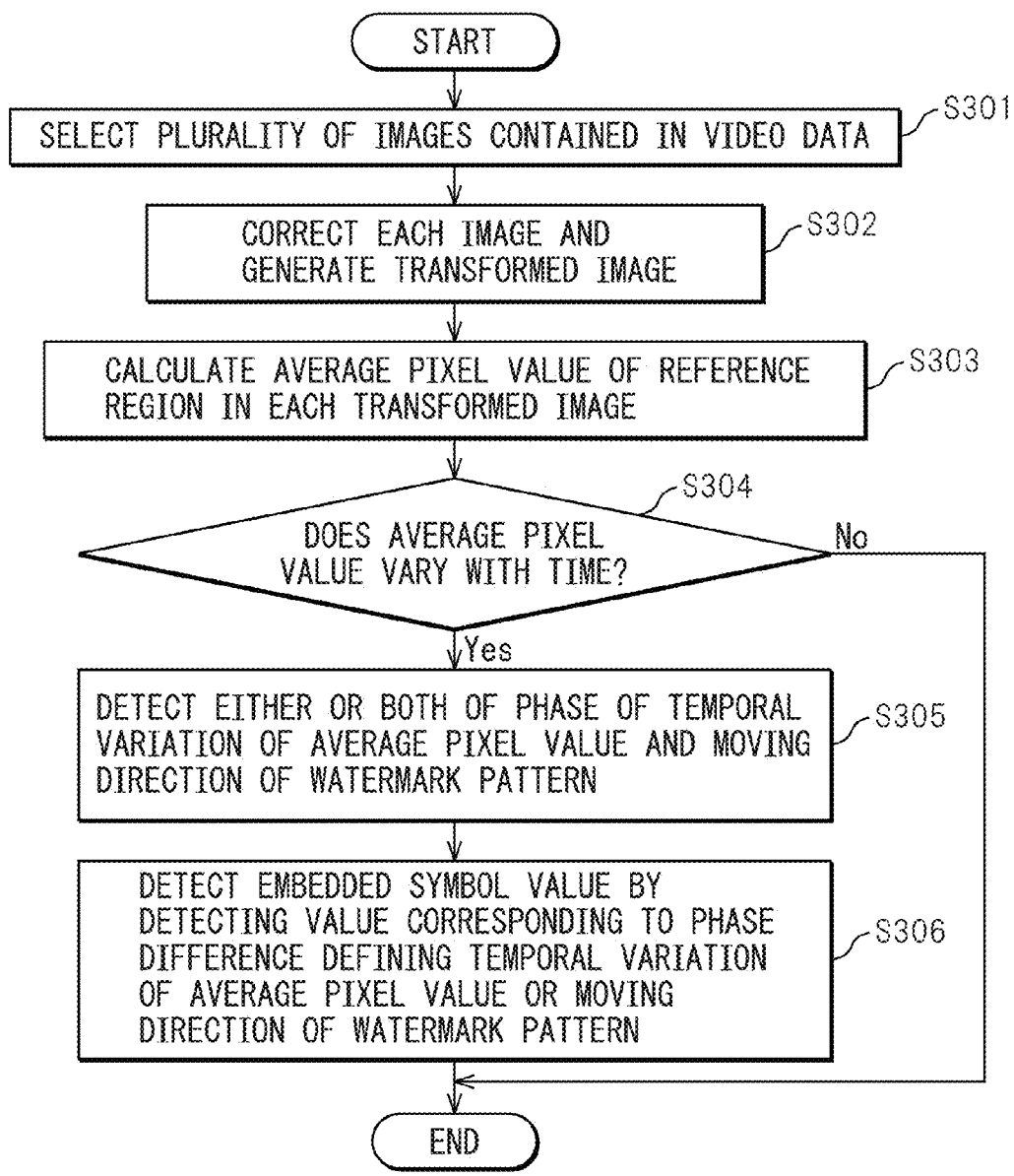
FIG. 17 is an operation flowchart illustrating a digital watermark detection process performed under the control of a computer program executed on the processing unit in the digital watermark detection apparatus.

FIG. 17 is an operation flowchart illustrating a digital watermark detection process performed under the control of a computer program executed on the processing unit 33 in the digital watermark detection apparatus 4. The processing unit 33 carries out the following process for each symbol contained in the digital watermark information embedded in the video data.

The processing unit 33 selects a plurality of images contained in the video data (step S301).

The transform unit 41 in the processing unit 33 corrects each selected image so that the shape and pixel count of the moving-image region on the selected image become equal to the shape and pixel count of the image contained in the video data in which the digital watermark is embedded. Then, when the watermark pattern is inverse random-transformed or inverse orthogonal-transformed by the digital watermark embedding apparatus, the transform unit 41 generates a transformed image by random-transforming or orthogonal-transforming the image (step S302). The transform unit 41 then passes the transformed image to the average pixel value calculation unit 42 in the processing unit 33.

The average pixel value calculation unit 42 calculates the average pixel value for the reference region in each transformed image (step S303). Then, the average pixel value calculation unit 42 passes the average pixel value of the reference region to the watermark pattern detection unit 43.

The watermark pattern detection unit 43 determines whether the average pixel value of the reference region varies with time (step S304). When the average pixel value does not vary with time (No in step S304), the watermark pattern detection unit 43 determines that the watermark pattern is not superimposed. The watermark pattern detection unit 43 notifies the processing unit 33 accordingly. After that, the processing unit 33 terminates the digital watermark information detection process.

On the other hand, when the average pixel value does varies with time (Yes in step S304), the watermark pattern detection unit 43 determines that the watermark pattern is superimposed on the transformed image. Then, the watermark pattern detection unit 43 passes the result of the determination to the watermark pattern phase/moving direction detection unit 44 in the processing unit 33 to notify that the watermark pattern is superimposed.

The watermark pattern phase/moving direction detection unit 44 detects either or both of the phase of the temporal variation of the average pixel value of the reference region and the moving direction of the watermark pattern (step S305). Then, the watermark pattern phase/moving direction detection unit 44 notifies the digital watermark information extraction unit 45 of either or both of the phase and the moving direction.

By referring to the mapping table that maps the phase of the temporal variation of the average pixel value or the moving direction of the watermark pattern to the embedded value, the digital watermark information extraction unit 45 detects the value corresponding to the phase or the moving direction as the symbol value (step S306). In this case, the digital watermark information extraction unit 45 may apply error-correction decoding to each possible symbol pattern to detect the error-free pattern and may detect each symbol included in the error-free pattern as the embedded symbol value. After that, the processing unit 33 terminates the digital watermark detection process.

When a plurality of reference regions are defined on one transformed image, the processing unit 33 repeats the above steps S303 to S306 for each reference region.

The video data in which the digital watermark information is embedded by the digital watermark embedding apparatus may be color image data. For example, if the video data has luminance information for each of three colors, red (R), green (G), and blue (B), the digital watermark embedding apparatus according to each embodiment may perform the above digital watermark embedding process on any one of the three colors. In this case, the digital watermark detection apparatus may perform the above digital watermark detection process on the color for which the digital watermark information is embedded.

According to another modified example, the watermark pattern position determining unit in the digital watermark embedding apparatus may allocate a plurality of images contained in a prescribed time period for each symbol contained in the digital watermark information. In this case, the digital watermark embedding apparatus can embed a plurality of symbols along the time series direction in the video data. The prescribed time period is set, for example, to one to several times the moving period of the watermark pattern. In this case, each time the time period corresponding to one symbol embedded in the video data ends, a prescribed pattern indicating a symbol boundary may be superimposed on the image that lasts until the time period corresponding to the next symbol begins.

Further, in this case, the digital watermark detection apparatus detects the plurality of embedded symbols for each prescribed time period by detecting the variation of the average pixel value of the reference region for each prescribed time period and the phase difference for the variation of the average pixel value or the moving direction of the watermark pattern. The digital watermark detection apparatus can identify each prescribed time period by detecting the prescribed pattern indicating the symbol boundary by using, for example, a technique of pattern matching.

The digital watermark embedding apparatus according to each of the above embodiments is incorporated, for example, in a set-top box, a server, or a personal computer. Then, when reproducing the video data, i.e., video content, received via the communication network or the antenna, the apparatus equipped with the digital watermark embedding apparatus performs the above digital watermark embedding process on the video data. If the video data is data compressed by a prescribed compression scheme, the apparatus decodes each image in the video data in accordance with the prescribed compression scheme. Then, the apparatus stores the images decoded from the video data into its buffer memory in time series order. Next, the apparatus retrieves each image from the buffer memory in time series order, performs the digital watermark embedding process, and causes the display unit to display the image in which the digital watermark information is embedded.

The computer program for causing a computer to implement the various functions of the processing unit in the digital watermark embedding apparatus according to each of the above embodiments may be provided in the form recorded on a medium readable by the computer. Likewise, the computer program for causing a computer to implement the various functions of the processing unit in the digital watermark detection apparatus according to the above embodiment may be provided in the form recorded on a medium readable by the computer. However, the computer readable recording medium does not include a carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A digital watermark embedding apparatus comprising:
   an interface unit which acquires video data and digital watermark information; and
   a processing unit which embeds the digital watermark information into the video data, wherein the processing unit implements:
   a watermark pattern position determining function which determines the position of a watermark pattern including a plurality of pixels and to be superimposed on each image contained in the video data so that the watermark pattern moves with time according to the value of a symbol contained in the digital watermark information within a first moving range that contains at least a portion of a reference region defined in a designated position on each image contained in the video data, and so that an average pixel value of the reference region overlapped with the watermark pattern varies in a periodic fashion as the watermark pattern moves; and
   a watermark pattern superimposing function which corrects the value of each pixel contained in a region where the reference region and the watermark pattern overlap each other by using the value of a corresponding one of the pixels contained in the watermark pattern.

2. The digital watermark embedding apparatus according to claim 1, wherein the reference region defined on each of the plurality of images contained in the video data is defined on a random-transformed image generated by a random transform that interchanges each pixel in the image with another pixel in the image in accordance with a prescribed transformation rule, and wherein
   the processing unit further implements an inverse random transform function which applies an inverse random-transform, an inverse of the random transform, to the pixels contained in the region where the reference region defined on the random-transformed image and the watermark pattern overlap each other, and
   for each of the plurality of images contained in the video data, the watermark pattern superimposing function corrects the value of any pixel superimposed by a pixel contained in the inverse random-transformed watermark pattern by using the value of the inverse random-transformed pixel.

3. The digital watermark embedding apparatus according to claim 1, wherein the processing unit further implements an orthogonal transform function which applies an orthogonal transform to each of the plurality of images contained in the video data and thereby generates an orthogonal-transformed image, and an inverse orthogonal transform function which applies an inverse orthogonal transform, an inverse of the orthogonal transform, to each of the orthogonal-transformed images, and wherein
   the reference region defined on each of the plurality of images contained in the video data is defined in a prescribed region on each of the orthogonal-transformed images, and
   the watermark pattern superimposing function corrects the value of each pixel contained in the region where the reference region defined on each of the orthogonal-transformed images and the watermark pattern overlap each other by using the value of a corresponding one of the pixels contained in the watermark pattern.

4. The digital watermark embedding apparatus according to claim 1, wherein the watermark pattern position determining function sets the moving direction of the watermark pattern so as to differ according to the value of the symbol contained in the digital watermark information.

5. The digital watermark embedding apparatus according to claim 4, wherein when the symbol takes a first value, the watermark pattern position determining function sets the moving direction of the watermark pattern so that the watermark pattern moves in a horizontal direction on the image on which the watermark pattern is superimposed, and when the symbol takes a second value which is different from the first value, the watermark pattern position determining function sets the moving direction of the watermark pattern so that the watermark pattern moves in a vertical direction on the image on which the watermark pattern is superimposed.

6. The digital watermark embedding apparatus according to claim 4, wherein the watermark pattern has a fan shape whose center is located at one corner of the reference region, and wherein when the symbol takes a first value, the watermark pattern position determining function sets the moving direction of the watermark pattern so that the watermark pattern rotates in a clockwise direction around the center, and when the symbol takes a second value which is different from the first value, the watermark pattern position determining function sets the moving direction of the watermark pattern so that the watermark pattern rotates in a counterclockwise direction around the center.

7. The digital watermark embedding apparatus according to claim 1, wherein the watermark pattern position determining function, in accordance with the value of the symbol contained in the digital watermark information, sets a phase that defines the periodic variation of the average pixel value of the reference region overlapped with the watermark pattern, and determines the position of the watermark pattern on each of the plurality of images in accordance with the phase.

8. A digital watermark embedding method comprising:
   acquiring video data and digital watermark information;
   determining the position of a watermark pattern including a plurality of pixels and to be superimposed on each image contained in the video data so that the watermark pattern moves with time according to the value of a symbol contained in the digital watermark information within a first moving range that contains at least a portion of a reference region defined in a designated position on each image contained in the video data, and so that an average pixel value of the reference region overlapped with the watermark pattern varies in a periodic fashion as the watermark pattern moves; and correcting the value of each pixel contained in a region where the reference region and the watermark pattern overlap each other by using the value of a corresponding one of the pixels contained in the watermark pattern.

9. The digital watermark embedding method according to claim 8, wherein the reference region defined on each of the plurality of images contained in the video data is defined on a random-transformed image generated by a random transform that interchanges each pixel in the image with another pixel in the image in accordance with a prescribed transformation rule, and further comprising applying an inverse random-transform, an inverse of the random transform, to the pixels contained in the region where the reference region defined on the random-transformed image and the watermark pattern overlap each other, and wherein for each of the plurality of images contained in the video data, the correcting the value of each pixel contained in the region corrects the value of any pixel superimposed by a pixel contained in the inverse random-transformed watermark pattern by using the value of the inverse random-transformed pixel.

10. The digital watermark embedding method according to claim 8, further comprising:

applying an orthogonal transform to each of the plurality of images contained in the video data and thereby generating an orthogonal-transformed image, and applying an inverse orthogonal transform, an inverse of the orthogonal transform, to each of the orthogonal-transformed images, and wherein the reference region defined on each of the plurality of images contained in the video data is defined in a prescribed region on each of the orthogonal-transformed images, and the correcting the value of each pixel contained in the region corrects the value of each pixel contained in the region where the reference region defined on each of the orthogonal-transformed images and the watermark pattern overlap each other by using the value of a corresponding one of the pixels contained in the watermark pattern.

11. The digital watermark embedding method according to claim 8, wherein the determining the position of the watermark pattern sets the moving direction of the watermark pattern so as to differ according to the value of the symbol contained in the digital watermark information.

12. The digital watermark embedding method according to claim 11, wherein when the symbol takes a first value, the determining the position of the watermark pattern sets the moving direction of the watermark pattern so that the watermark pattern moves in a horizontal direction on the image on which the watermark pattern is superimposed, and when the symbol takes a second value which is different from the first value, the determining the position of the watermark pattern sets the moving direction of the watermark pattern so that the watermark pattern moves in a vertical direction on the image on which the watermark pattern is superimposed.

13. The digital watermark embedding method according to claim 11, wherein the watermark pattern has a fan shape whose center is located at one corner of the reference region, and wherein when the symbol takes a first value, the determining the position of the watermark pattern sets the moving direction of the watermark pattern so that the watermark pattern rotates in a clockwise direction around the center, and when the symbol takes a second value which is different from the first value, the determining the position of the watermark pattern sets the moving direction of the watermark pattern so that the watermark pattern rotates in a counterclockwise direction around the center.

14. The digital watermark embedding method according to claim 8, wherein the determining the position of the watermark pattern, in accordance with the value of the symbol contained in the digital watermark information, sets a phase that defines the periodic variation of the average pixel value of the reference region overlapped with the watermark pattern, and determines the position of the watermark pattern on each of the plurality of images in accordance with the phase.

15. A non-transitory computer readable recording medium having a digital watermark embedding computer program recorded thereon for causing a computer to execute the process of embedding digital watermark information into video data, and wherein the digital watermark embedding computer program causes the computer to execute: determining the position of a watermark pattern including a plurality of pixels and to be superimposed on each image contained in the video data so that the watermark pattern moves with time according to the value of a symbol contained in the digital watermark information within a first moving range that contains at least a portion of a reference region defined in a designated position on each image contained in the video data, and so that an average pixel value of the reference region overlapped with the watermark pattern varies in a periodic fashion as the watermark pattern moves; and correcting the value of each pixel contained in a region where the reference region and the watermark pattern overlap each other by using the value of a corresponding one of the pixels contained in the watermark pattern.

* * * * *